United States Patent
Jung et al.

(10) Patent No.: US 10,164,692 B2
(45) Date of Patent: Dec. 25, 2018

(54) APPARATUS AND METHOD FOR MANAGING RADIO LINK IN WIRELESS COMMUNICATION SYSTEM

(71) Applicant: Samsung Electronics Co., Ltd., Gyeonggi-do (KR)

(72) Inventors: Doyoung Jung, Gyeonggi-do (KR); Changyeul Kwon, Gyeonggi-do (KR); Donghwi Roh, Seoul (KR); Sungrok Yoon, Seoul (KR); Seok-Yong Lee, Seould (KR); Ohyun Jo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/089,445

(22) Filed: Apr. 1, 2016

(65) Prior Publication Data
US 2016/0294451 A1 Oct. 6, 2016

(30) Foreign Application Priority Data

Apr. 1, 2015 (KR) ........................ 10-2015-0046352

(51) Int. Cl.
*H04B 7/0408* (2017.01)
*H04B 17/20* (2015.01)
*H04B 7/06* (2006.01)

(52) U.S. Cl.
CPC .......... *H04B 7/0408* (2013.01); *H04B 7/063* (2013.01); *H04B 7/0617* (2013.01); *H04B 17/20* (2015.01)

(58) Field of Classification Search
CPC combination set(s) only.
See application file for complete search history.

(56) References Cited

U.S. PATENT DOCUMENTS

| | | | |
|---|---|---|---|
| 8,457,026 B1 | 6/2013 | Ho et al. | |
| 2009/0278743 A1 | 11/2009 | Wee | |
| 2010/0195588 A1 | 8/2010 | Wan et al. | |
| 2010/0214169 A1 | 8/2010 | Kafle | |
| 2012/0287797 A1 | 11/2012 | Basson et al. | |
| 2013/0028092 A1* | 1/2013 | Tong | H04L 47/26 370/236 |
| 2014/0016495 A1 | 1/2014 | Li et al. | |
| 2014/0185551 A1* | 7/2014 | Sanderovich | H04L 1/0015 370/329 |
| 2016/0277087 A1* | 9/2016 | Jo | H04B 7/0617 |

OTHER PUBLICATIONS

International Search Report dated Jul. 22, 2016 in connection with International Application No. PCT/KR2016/003391, 3 pages.
RF Designhouse; "The Basic of RF—Corner Book—Chapter 10—Antenna"; retrieved from http://www.rfdh.com/bas_rf/begin/antenna.php3; Jan. 1, 2009; 64 pages.
IEEE Standard for Information Technology; Part 11: Wireless LAN Medium Access Control (MAC and Physical Layer (PHY) Specifications; Amend. 3; 2012; 628 pages.
Communication from a foreign patent office in a counterpart foreign application, European Patent Office, "Supplementary Partial European Search Report," European Patent Application No. 16773489.6, dated Mar. 1, 2018; 13 pages.
Extended European Search Report regarding Application No. 16773489.6, dated Jun. 8, 2018, 11 pages.

* cited by examiner

*Primary Examiner* — Wednel Cadeau

(57) ABSTRACT

A method of operating a transmission device in a wireless communication system includes: determining a reception state of a reception device; and performing beamforming based on the reception state.

19 Claims, 33 Drawing Sheets ic cation Serial No. 10-2015-0046352, which was filed in the Korean Intellectual Property Office on Apr. 1, 2015, the entire content of which is hereby incorporated by reference.

APPARATUS AND METHOD FOR MANAGING RADIO LINK IN WIRELESS COMMUNICATION SYSTEM

CROSS-REFERENCE TO RELATED APPLICATION AND CLAIM OF PRIORITY

The present application is related to and claims the priority benefit under 35 U.S.C. § 119(a) to Korean Application Serial No. 10-2015-0046352, which was filed in the Korean Intellectual Property Office on Apr. 1, 2015, the entire content of which is hereby incorporated by reference.

TECHNICAL FIELD

The present disclosure relates to a technology for managing a radio link in a wireless communication system.

BACKGROUND

In order to meet wireless data traffic demands that have increased after system commercialization, efforts to develop an improved 5G communication system or a pre-5G communication system have been made. For this reason, the 5G communication system or the pre-5G communication system is called a beyond 4G network communication system or a post LTE system. In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large scale antenna are discussed to mitigate a propagation path loss in the mmWave band and increase a propagation transmission distance. Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network. In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has been evolved to the Internet of Things (IoT) network that exchanges and process information between distributed components such as objects and the like in a human-oriented connection network in which humans generate and consume information. An Internet of Everything (IoE) technology in which a big data processing technology through a connection with a cloud server or the like is combined with the IoT technology has emerged. In order to implement the IoT, technical factors such as a sensing technique, wired/wireless communication, network infrastructure, service interface technology, and security technology are required, and thus technologies such as a sensor network, Machine to Machine (M2M), Machine Type Communication (MTC), and the like for a connection between objects are recently researched. In an IoT environment, through collection and analysis of data generated in connected objects, an intelligent Internet Technology (IT) service to create a new value for the human's life may be provided. The IoT may be applied to fields such as a smart home, smart building, smart city, smart car, connected car, smart grid, health care, smart home appliance, high health care service, and the like through the convergence of the Information Technologies (ITs) and various industries.

Accordingly, various attempts to apply the 5G communication to the IoT network are made. For example, technologies such as a sensor network, Machine to Machine (M2M), and Machine Type Communication (MTC) are implemented by beamforming, MIMO, and array antenna schemes. The application of a cloud RAN as the big data processing technology may be an example of convergence of the 5G technology and the IoT technology.

Due to the development and popularization of wireless communication technologies, a currently commonly used frequency spectrum has reached saturation. Accordingly, interest in a wireless communication technology using a super-high frequency such as spectrums other than the commonly used frequency spectrum, for example, a millimeter wave spectrum has increased.

SUMMARY

To address the above-discussed deficiencies, it is a primary object to provide an apparatus and a method for performing and managing beamforming by a transmission device based on a state change of a link with a reception device and Quality of Service (QoS).

Another embodiment of the present disclosure provides an apparatus and a method for changing a data rate by a transmission device based on a state change of a link with a reception device and QoS of the like.

Another embodiment of the present disclosure provides an apparatus and a method for determining QoS of a link with a reception device by a transmission device.

Another embodiment of the present disclosure provides an apparatus and a method for monitoring a reception state of a reception device to determine QoS of a link with the reception device by a transmission device.

Another embodiment of the present disclosure provides an apparatus and a method for performing second beamforming with a minimum beamforming cost by a transmission device based on a result of first beamforming.

Another embodiment of the present disclosure provides an apparatus and a method for improving or maintaining QoS by limiting performance of unnecessary beamforming by a transmission device.

Another embodiment of the present disclosure provides an apparatus and a method for rapidly performing second beamforming when a transmission device fails in first beamforming.

In accordance with an aspect of the present disclosure, a method of operating a transmission device in a wireless communication system is provided. The method includes: determining a reception state of a reception device; and performing beamforming based on the reception state.

In accordance with another aspect of the present disclosure, a method of operating a reception device in a wireless communication system is provided. The method includes: transmitting information for determining whether to perform beamforming to a transmission device; and receiving data from the transmission device through at least one beam formed based on the information for determining whether to perform the beamforming.

In accordance with another aspect of the present disclosure, a transmission device in a wireless communication system is provided. The transmission device includes a controller configured to determine a reception state of a reception device and determine whether to perform beamforming based on the reception state.

In accordance with another aspect of the present disclosure, a reception device in a wireless communication system is provided. The reception device includes a communication unit configured to transmit information for determining whether to perform beamforming to the transmission device and receive data from the transmission device through at least one beam formed based on the information for determining whether to perform the beamforming.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
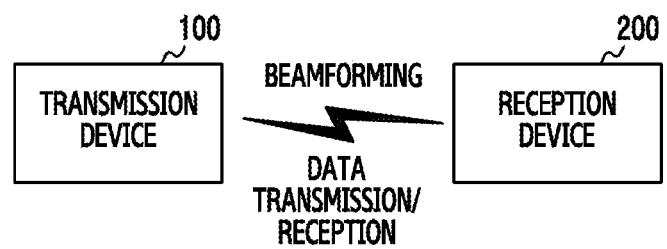
FIG. 1 illustrates a transmission device and a reception device according to an embodiment of the present disclosure.

FIGS. 1 through 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Hereinafter, the operational principle of the present disclosure will be described in detail with reference to the accompanying drawings. In describing the present disclosure below, a detailed description of related known configurations or functions incorporated herein will be omitted when it is determined that the detailed description thereof may unnecessarily obscure the subject matter of the present disclosure. The terms which will be described below are terms defined in consideration of the functions in the present disclosure, and may be different according to users, intentions of the users, or customs. Therefore, the definition should be made based on the overall contents of the present specification.

Hereinafter, various embodiments of the present disclosure will be described more fully in conjunction with the accompanying drawings. The present disclosure may have various embodiments, and modifications and changes may be made therein. Therefore, the present disclosure will be described in detail with reference to particular embodiments shown in the accompanying drawings. However, it should be understood that there is no intent to limit various embodiments of the present disclosure to the particular embodiments disclosed herein, but the present disclosure should be construed to cover all modifications, equivalents, and/or alternatives falling within the spirit and scope of the various embodiments of the present disclosure. In connection with descriptions of the drawings, like reference numerals designate like elements.

As used in various embodiments of the present disclosure, the expressions "include", "may include", and other conjugates refer to the existence of a corresponding disclosed function, operation, or constituent element, and do not limit one or more additional functions, operations, or constituent elements. Further, as used in various embodiments of the present disclosure, the terms "include", "have", and their conjugates are intended merely to denote a certain feature, numeral, step, operation, element, component, or a combination thereof, and should not be construed to initially exclude the existence of or a possibility of addition of one or more other features, numerals, steps, operations, elements, components, or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

While expressions including ordinal numbers, such as "first" and "second", as used in various embodiments of the present disclosure may modify various constituent elements, such constituent elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, without departing from the scope of the present disclosure, a first component element may be named a second component element. Similarly, the second component element also may be named the first component element.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

The terms as used in various embodiments of the present disclosure are merely for the purpose of describing particular embodiments and are not intended to limit the various embodiments of the present disclosure. As used herein, the singular forms are intended to include the plural forms as well, unless the context clearly indicates otherwise. Unless defined otherwise, all terms used herein, including technical terms and scientific terms, have the same meaning as commonly understood by a person of ordinary skill in the art to which various embodiments of the present disclosure pertain. Such terms as those defined in a generally used dictionary are to be interpreted to have the meanings equal to the contextual meanings in the relevant field of art, and are not to be interpreted to have ideal or excessively formal meanings unless clearly defined in the present disclosure.

The millimeter wave spectrum has a relatively high transmission loss compared to a low frequency spectrum, so that a beamforming technology to increase a distance range is needed to use the millimeter wave spectrum. Further, in order to manage a radio link of the millimeter wave spectrum, it may be required to manage the beamforming. The present disclosure describes a technology for managing a radio link in a wireless communication system.

FIG. 1 illustrates a transmission device and a reception device according to an embodiment of the present disclosure.

Referring to FIG. 1, the transmission device 100 and the reception device 200 may be electronic devices including a communication function. For example, the electronic device 100 and the reception device 200 may include at least one of a smart phone, a tablet Personal Computer (PC), a mobile phone, a video phone, an e-book reader, a desktop PC, a laptop PC, a netbook computer, a Personal digital Assistant (PDA), a Portable Multimedia Player (PMP), an MP3 player, a mobile medical device, a camera, a wearable device (for example, a Head-Mounted-Device (HIVID) such as electronic glasses), electronic clothes, an electronic bracelet, an electronic necklace, an electronic appcessory, an electronic tattoo, a smart watch, a set top box, and a smart TeleVision (TV).

According to another embodiment of the present disclosure, the transmission device 100 may be referred to as a source device and the reception device 200 may be referred to as a sink device.

According to an embodiment of the present disclosure, the transmission device 100 and the reception device 200 may form a link through beamforming. The transmission device 100 and the reception device 200 may transmit/receive data through the formed link.

Figure 2:
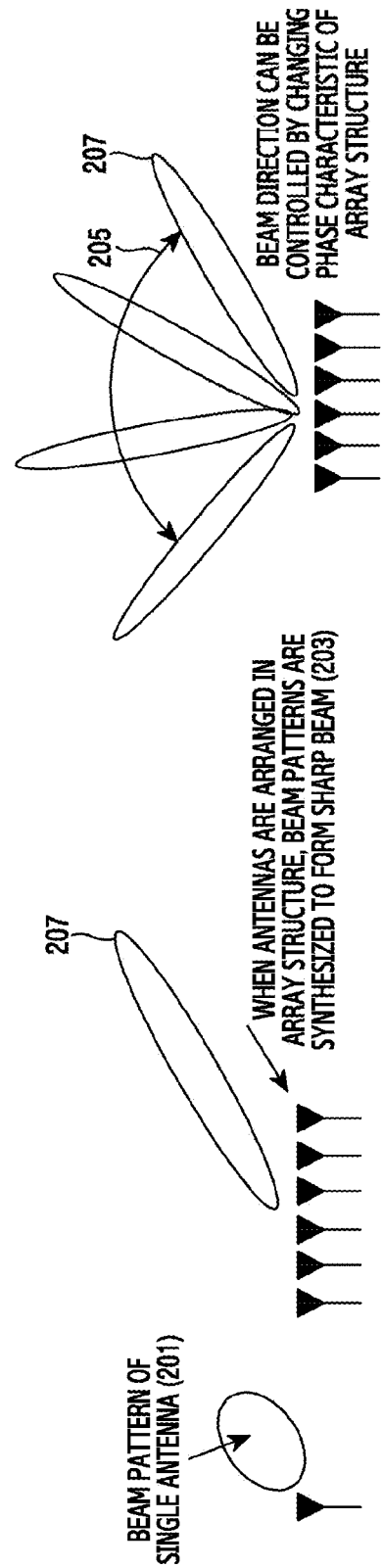
FIG. 2 illustrates beamforming performed by the transmission device and the reception device, including a plurality of antennas according to an embodiment of the present disclosure.

FIG. 2 illustrates beamforming performed by the transmission device and the reception device, including a plurality of antennas according to an embodiment of the present disclosure.

Referring to FIG. 2, when the transmission device 100 and the reception device 200 arrange the plurality of antennas in a specific type array as indicated by reference numeral 203, beam patterns of the antennas may be spatially synthesized. Accordingly, the transmission device 100 and the reception device 200 including the plurality of antennas may generate a sharp beam 207 having directivity unlike a case of a single-antenna beam pattern 201 where a single antenna is used. Further, the transmission device 100 and the reception device 200 may steer (as indicated by reference numeral 205) a direction of the beam by changing settings for a phase of each of the plurality of antennas.

Figure 3A:
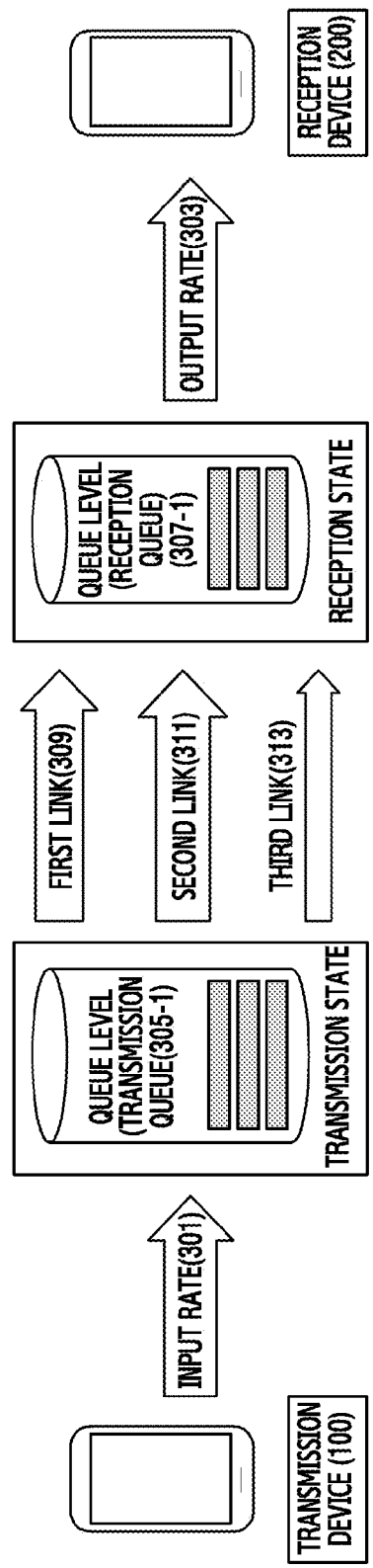
FIGS. 3A to 3C illustrate a change in each queue level based on a link state change of the transmission device and the reception device using a real time service according to an embodiment of the present disclosure.
Figure 3B:
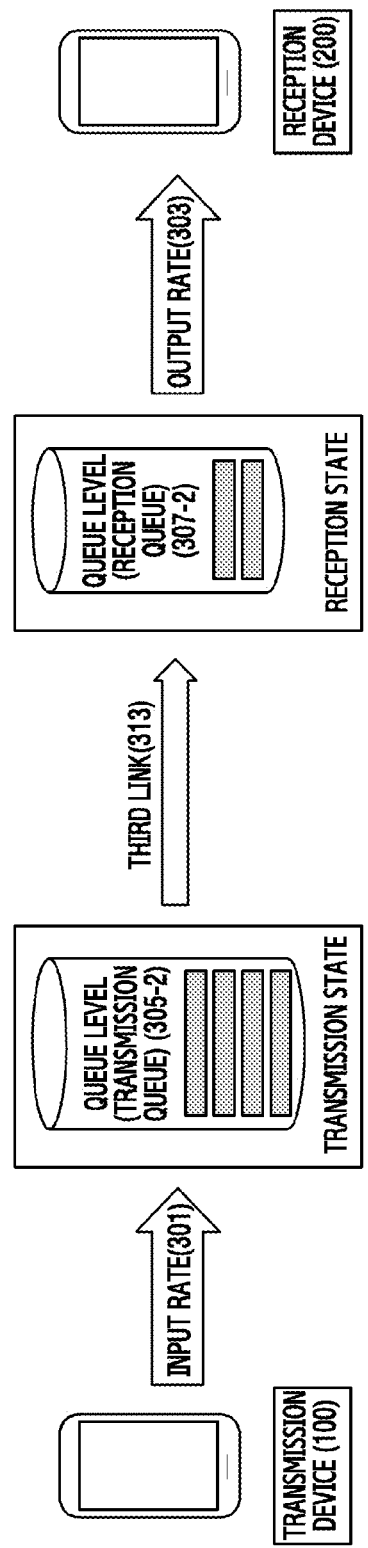
Figure 3C:
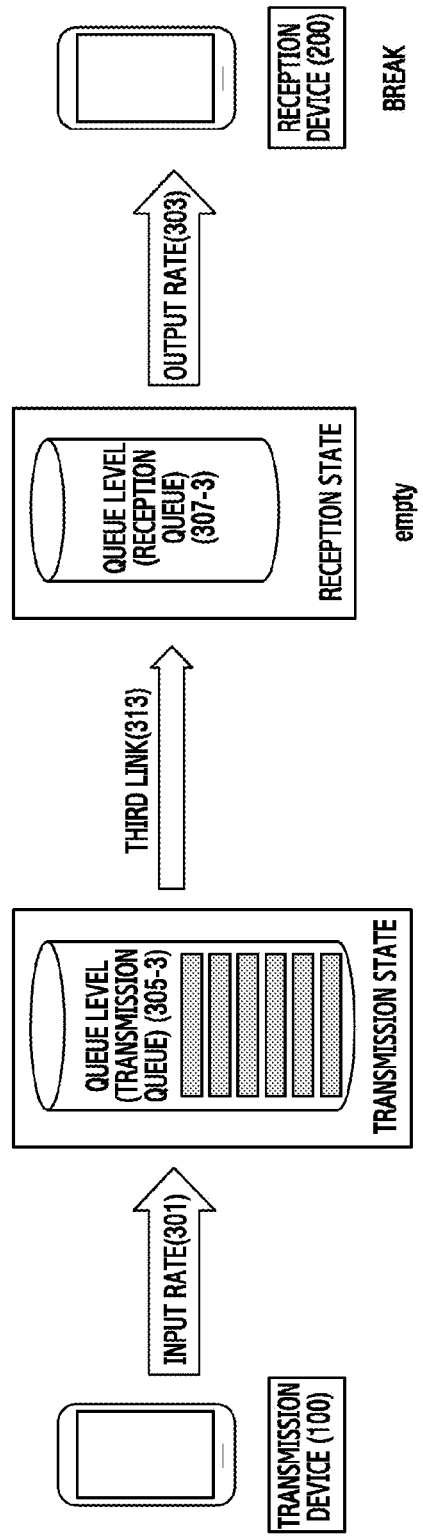

FIGS. 3A to 3C illustrate a change in each queue level based on a link state change of the transmission device and the reception device using a real time service according to an embodiment of the present disclosure.

An input rate 301 of the transmission device 100 and an output rate 303 of the reception device 200 may be determined according to a type of the real time service. Further, the input rate 301 and the output rate 303 may have the same value. A number of packets, which can be stored in a transmission queue level 305-1 of the transmission device 100 and a reception queue level 307-1 of the reception device 200, that is, a queue of the transmission device 100 and a queue of the reception device 200, may be determined by a Packet Delivery Rate (PDR) or a Packet Error Rate (PER) of a wireless channel between the transmission device 100 and the reception device 200.

Between the transmission device 100 and the reception device 200 which can perform beamforming, various links 309 to 313 having different link states, that is, different transmission rates may exist. When the packet delivery rate of the wireless channel between the transmission device 100 and the reception device 200 is larger than or equal to a predetermined reference, the transmission queue level 305-1 and the reception queue level 307-1 may be uniformly maintained.

In contrast, referring to FIG. 3B, when the packet delivery rate of the wireless channel is smaller than the predetermined reference, the transmission queue level 305-2 may increase and the reception queue level 307-2 may decrease.

Further, when the state where the transmission queue level 305-3 increases and the reception queue level 307-2 decreases continues, the reception queue level 307-3 may correspond to zero (0), that is, there may be no packet stored in the reception queue. Accordingly, the real time service may be disconnected in the reception device 200. For example, when the real time service is a video streaming service, a screen output through the video streaming service may be disconnected in the reception device 200. In order to control quality of the real time service, the reception queue level 307-3 should not be zero by searching for and maintaining the radio link, through which a packet delivery rate larger than or equal to the predetermined reference can be provided.

For example, the transmission device 100 and the reception device 200 may select one of available transmission rates according to a state of the radio link to control the quality of the real time service. However, at this time, when the transmission device 100 and the reception device 200 use a lowest transmission rate among the available transmission rates, the quality of the real time service may not be satisfactory since the transmission rate cannot be lowered anymore.

When performance deterioration of the radio link between the transmission device 100 and the reception device 200 is generated, a beamforming method based on link adaptation or prediction about the link state may be used to recovery the radio link state.

Figure 4:
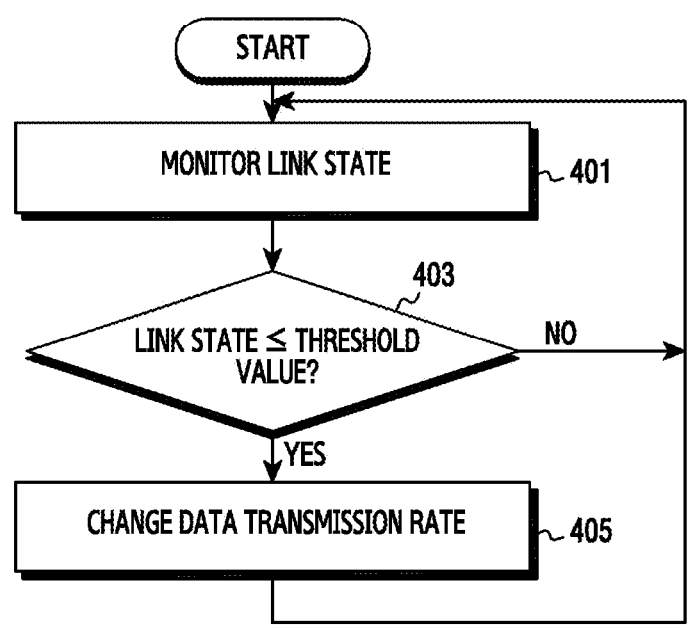
FIG. 4 illustrates a method of managing a link by the transmission device according to an embodiment of the present disclosure.

FIG. 4 illustrates a method of managing a link by the transmission device according to an embodiment of the present disclosure.

Referring to FIG. 4, the transmission device 100 monitors a link state between the transmission device 100 and the reception device 200 in step 401. In other words, the transmission device 100 keeps watch on the link state. For example, the transmission device 100 may monitor the link state through a radio index such as a Received Signal Strength Indicator (RSSI) and a Signal to Noise Ratio (SNR) or a Packet Error Rate (PER).

The transmission device 100 may determine whether the link state deteriorates in step 403. For example, when the link state becomes equal to or smaller than a predetermined threshold value, the transmission device 100 may determine that the link state has deteriorated. In contrast, when the link state exceeds the predetermined threshold value, the transmission device 100 may determine that the link state has not deteriorated. When the link state does not deteriorate, the transmission device 100 may return to step 401 and monitor the link state.

When it is determined that the link state has deteriorated, the transmission device 100 may determine a data transmission rate corresponding to the link state in step 405. The transmission device 100 may change the data transmission rate according to the link state within an available data transmission rate range. For example, the transmission device 100 may determine one modulation and coding method corresponding to the link state among a set of MCSs. In general, when the data transmission rate of the transmission device 100 is lowered, an SNR, which is required for normally receiving the packet by the reception device 200, may be lowered. Accordingly, even though the link state deteriorates, when the data transmission rate is lowered, the packet may be normally received. That is, when the link state is deteriorated, the transmission device may maintain the link for transmitting/receiving the packet by lowering the data transmission rate.

According to another embodiment of the present disclosure, the link state may be monitored by the reception device. For example, the reception device may monitor the link state based on at least one of an RSSI and an SNR. Further, whether to perform beamforming may be determined based on a result of the monitoring of the link state by the reception device.

Figure 5:
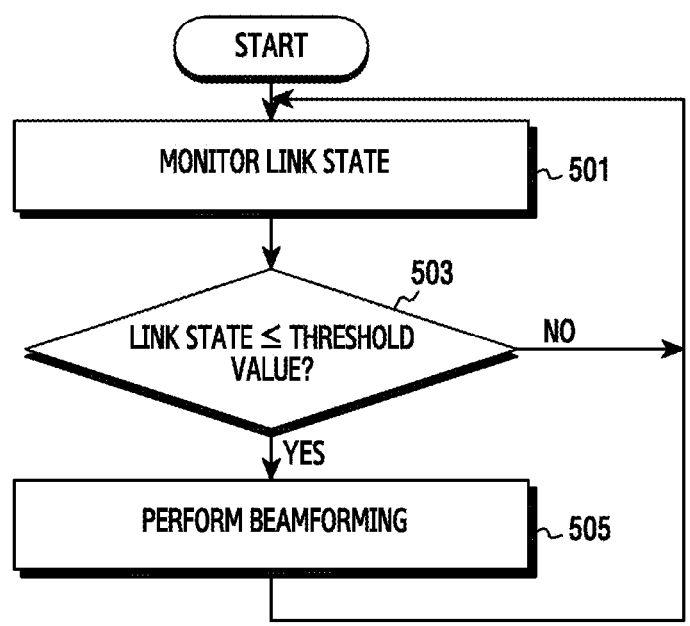
FIG. 5 illustrates another method of managing the link by the transmission device according to an embodiment of the present disclosure.

FIG. 5 illustrates another method of managing the link by the transmission device according to an embodiment of the present disclosure.

Referring to FIG. 5, the transmission device 100 monitors a link state between the transmission device 100 and the reception device 200 in step 501. For example, the transmission device 100 may monitor the link state through a radio index such as an RSSI and an SNR or a packet error rate.

The transmission device 100 may determine whether the link state deteriorates in step 503. For example, when the link state becomes equal to or smaller than a predetermined threshold value, the transmission device 100 may determine that the link state deteriorates. In contrast, when the link state exceeds the predetermined threshold value, the transmission device 100 may determine that the link state does not deteriorate. When the link state does not deteriorate, the transmission device 200 may return to step 501 and monitor the link state.

When it is determined that the link state has deteriorated, the transmission device 100 may perform beamforming in step 505. The beamforming may be implemented through a plurality of array antennas, and may improve an antenna gain and, accordingly, increase a distance to which data can be transmitted. Further, since the antennas through which the beamforming can be performed have directivity, the antennas may form different links for different antenna directions. If the transmission device 100 and the reception device 200 use non-directivity antennas, only one channel or link exists between the transmission device 100 and the reception device 200 (it does not mean that there are no various paths), so that only one channel characteristic may exist. However, when the transmission device 100 and the reception device 200 use the plurality of array antennas through which the beamforming can be performed, a plurality of channels or links may be formed between the transmission device 100 and the reception device 200 according to beam directions of the antennas. Accordingly, states or characteristics of the plurality of links may be different from each other. At this time, when at least one of the plurality of links deteriorates, the transmission device 100 may search for a better link between the transmission device 100 and the reception device 200 by performing the beamforming without changing the data transmission rate as illustrated in FIG. 4.

FIGS. 6A to 6E illustrate methods of performing beamforming by the transmission device according to an embodiment of the present disclosure.

Figure 6A:
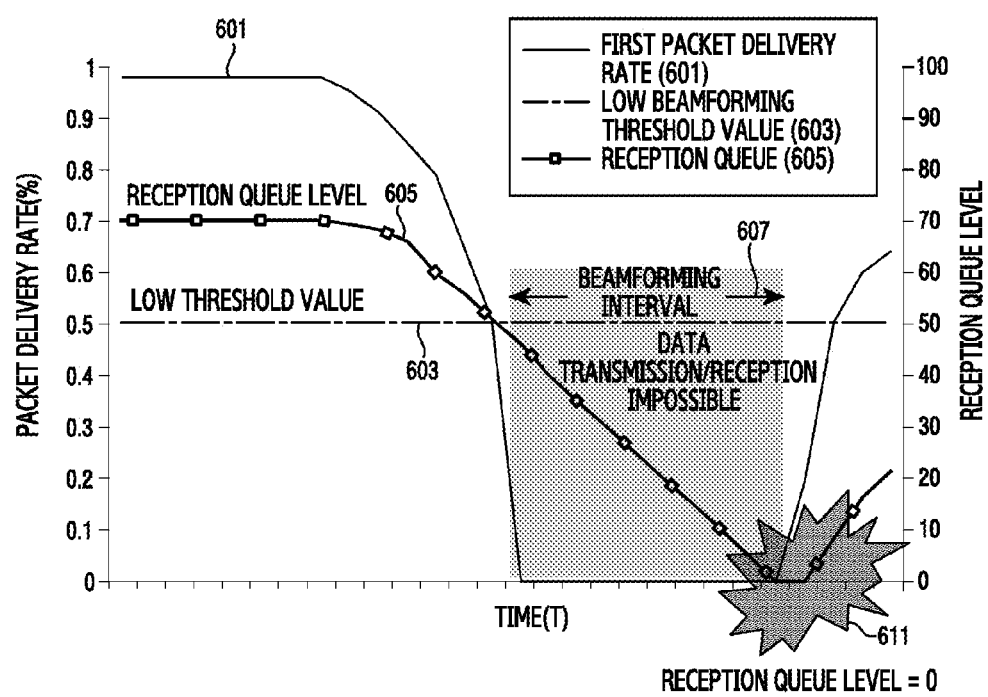
FIGS. 6A to 6E illustrate methods of performing beamforming by the transmission device according to an embodiment of the present disclosure.

FIG. 6A illustrates performance of beamforming due to a decrease in a data transmission rate. Referring to FIG. 6A, as a packet delivery rate 601 of the transmission device 100 decreases in one link, a reception queue level 605 of the reception device 200 also decreases. For example, when the packet delivery rate 601 decreases, the number of packets transmitted to the reception device 200 decreases, so that the reception queue level 605 may decrease. At this time, when the packet delivery rate 601 becomes smaller than a predetermined beamforming threshold value 603, the transmission device 100 may perform the beamforming. During a beamforming interval 607 in which the beamforming is performed, the transmission device 100 cannot transmit a data packet to the reception device. Accordingly, the transmission queue level 605 of the transmission device 100 continuously decreases in the beamforming interval 607. At this time, when the beamforming threshold value 603 is small, the reception queue level may become zero in the beamforming interval due to late performance of the beamforming. Accordingly, provision of the service may have a problem 611. For example, when the reception device 200 is a device that outputs a medical image received from the transmission device 100 in real time, the output of the medical image may be disconnected.

Figure 6B:
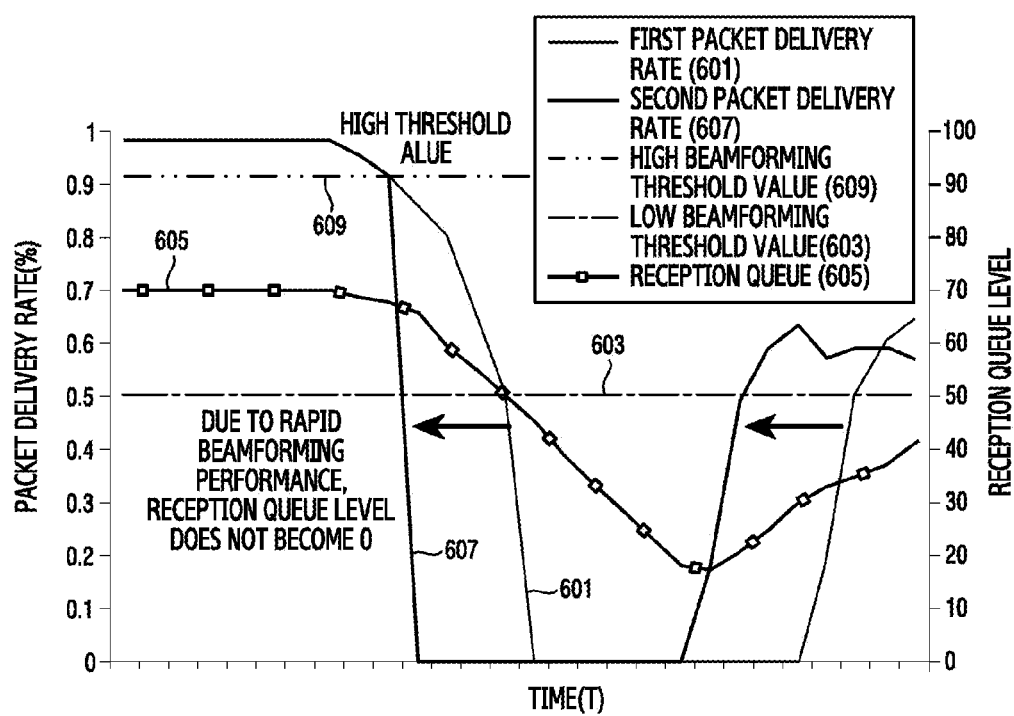

FIG. 6B illustrates a case where a high beamforming threshold value 609 is used to prevent the reception queue level from being empty. Referring to FIG. 6B, the transmission device 100 may set the high beamforming threshold value 609 in order to not make the reception queue level zero (0) due to the low beamforming threshold value. When the packet delivery rate decreases, the transmission device 100 may perform the beamforming more rapidly due to the high beamforming threshold value 609 compared to the low beamforming threshold value 603. Accordingly, the beamforming may be completed before the reception queue level 605 becomes zero.

Figure 6C:
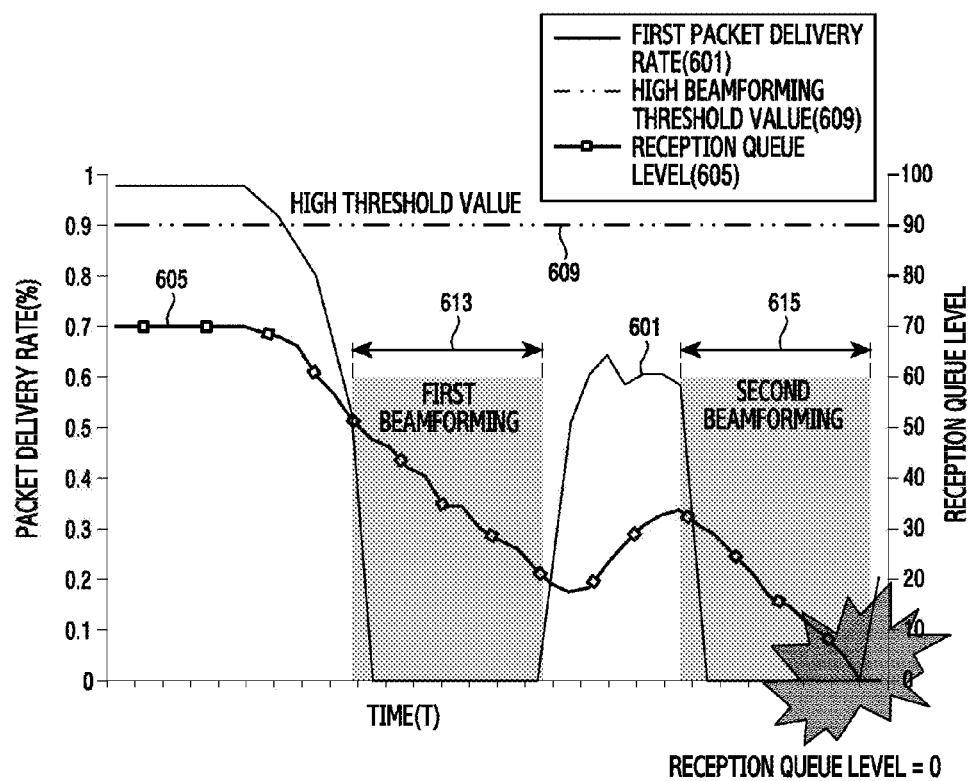

FIG. 6C illustrates a case where beamforming is successively performed. Referring to FIG. 6C, as the packet delivery rate 601 of the transmission device 100 decreases, the reception queue level 605 of the reception device 200 also decreases. For example, when the packet delivery rate 601 decreases, the number of packets transmitted to the reception device 200 decreases, so that the reception queue level 605 may decrease. At this time, when the packet delivery rate 601 becomes smaller than a predetermined high beamforming threshold value 609, the transmission device 100 may perform first beamforming. In FIG. 6C, the first beamforming is completed before the reception queue level 605 becomes zero. However, when the packet delivery rate 601 becomes smaller than the high beamforming threshold value 609 again, the transmission device 100 performs second beamforming. While the reception queue level has not become zero in the first beamforming interval 613 due to the high beamforming threshold value 609, the reception queue level becomes zero in the second beamforming interval 615 due to the successive beamforming, that is, the second beamforming. In other words, since the second beamforming starts in a state where the reception queue level is low even though the high beamforming threshold value 609 is used, the reception queue level may become zero in the second beamforming interval.

Figure 6D:
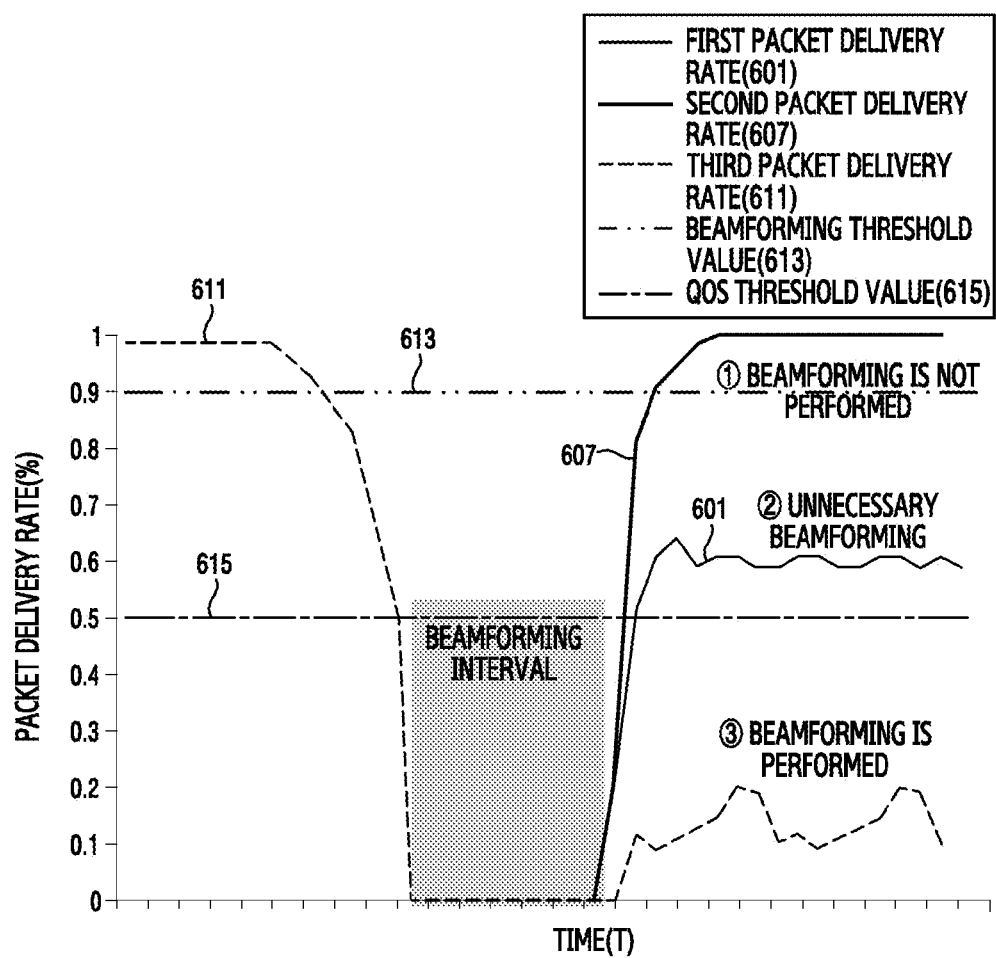

FIG. 6D illustrates situations in which whether to perform beamforming is determined according to a packet delivery rate after beamforming. Referring to FIG. 6D, the transmission device 100 may perform beamforming based on whether the packet delivery rate is larger than or equal to a beamforming threshold value 613. As illustrated in FIG. 6D, when the packet delivery rate exceeds the beamforming threshold value 613, the transmission device 100 does not perform the beamforming. Further, when the packet delivery rate is smaller than the beamforming threshold value 613, the transmission device performs the beamforming. However, when the packet delivery rate is smaller than the beamforming threshold vale 613 but is larger than or equal to a service quality threshold value 615, the beamforming may be unnecessary.

Figure 6E:
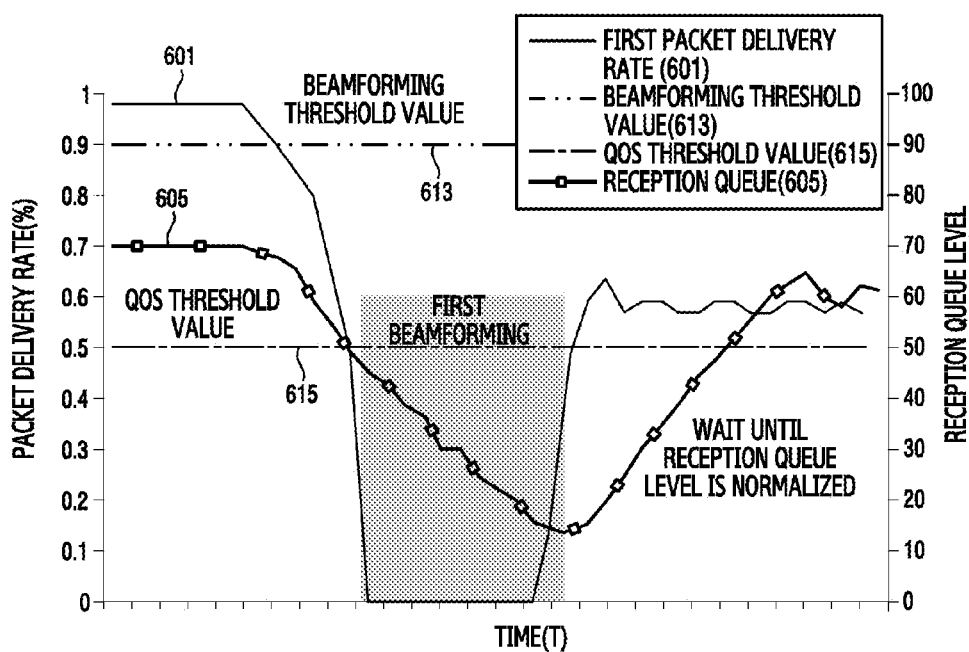

FIG. 6E illustrates a case where whether to perform beamforming is controlled in consideration of the reception queue level in successive beamforming. Referring to FIG. 6E, the transmission device 100 may control the performance of the second beamforming based on the service quality threshold value 615 in order to prevent the reception queue level from being zero in the second beamforming. The service quality threshold value 615 refers to a reference value for determining whether to perform the second beamforming after the transmission device 100 performs the first beamforming. The service quality threshold value 615 may be determined based on service quality of the reception device 200 according to the packet delivery rate 601. For example, when the packet delivery rate 601 decreases again after the first beamforming is performed, the transmission device 100 may determine whether the packet delivery rate 601 is larger than the service quality threshold value 615. When the decreased packet delivery rate 601 is larger than the service quality threshold value 615, the transmission device 100 may not perform or may delay the second beamforming. According to an embodiment of the present disclosure, the transmission device 100 may determine whether to perform the second beamforming based on whether a reception queue state of the reception device 200 is higher than a predetermined reference value.

Figure 7A:
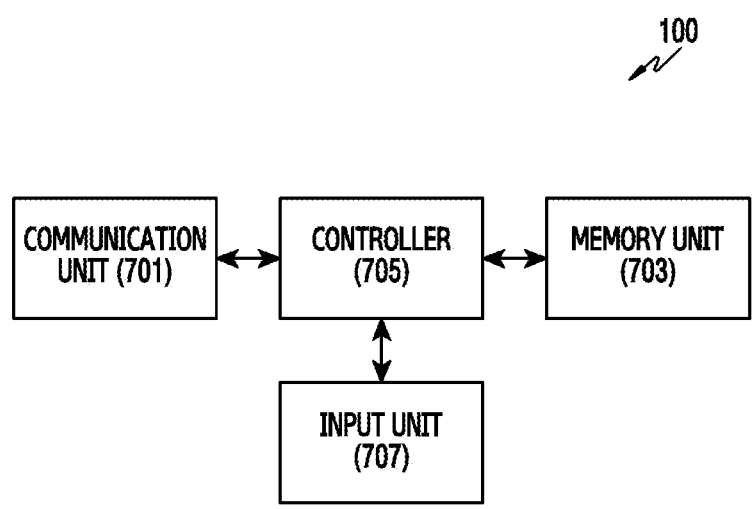
FIGS. 7A and 7B are block diagrams illustrating the transmission device according to an embodiment of the present disclosure.
Figure 7B:
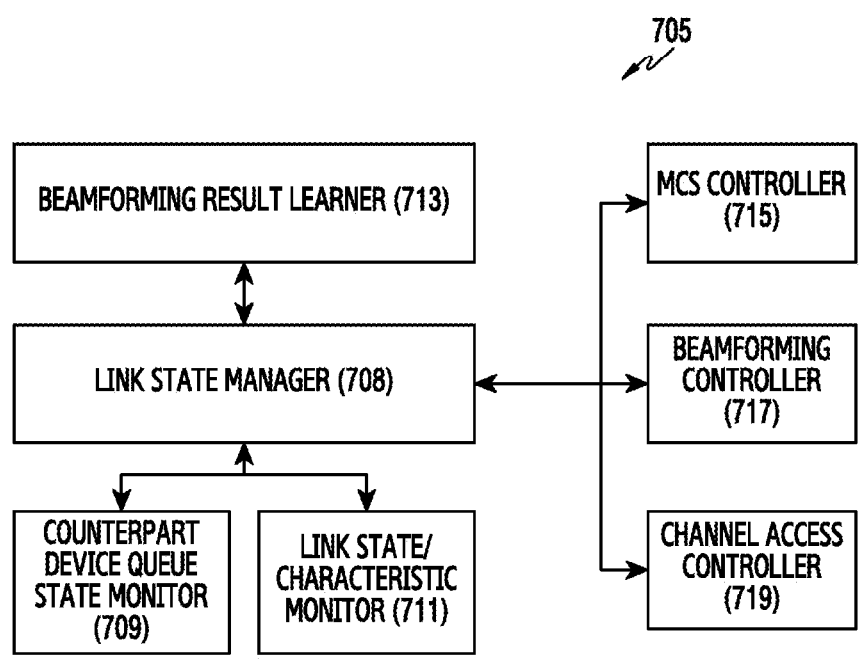

FIGS. 7A and 7B are block diagrams illustrating the transmission device according to an embodiment of the present disclosure.

Referring to FIG. 7A, the transmission device 100 may include a communication unit 701, a memory unit 703, a controller 705, and an input unit 707.

For example, the communication unit 701 performs a function of processing transmission/reception of a wireless signal of data input/output through an antenna (not shown). For example, in a case of transmission, data to be transmitted is subjected to channel coding, spreading, and then RF processing, and is transmitted. In a case of reception, a received RF signal is converted into a baseband signal, and the baseband signal is de-spread and channel-decoded, and thus data is reconstructed.

In addition to the general function, the communication unit 701 may transmit information about an available buffer capacity of the transmission device to the reception device and receive information about a total available buffer capacity and a current available buffer capacity of the reception device from the reception device according to an embodiment of the present disclosure. The communication unit 701 may receive information about the queue level of the reception device from the reception device at a first time and receive information about the number of consumed packets from the reception device from the first time to a second time.

The memory unit 703 stores micro codes of a program for processing and control by the controller 705 and various pieces reference data. In addition to the general function, the memory unit 703 may store information about an available buffer capacity of the transmission device and information about a total available buffer capacity and a current available buffer capacity of the reception device from the reception device according to an embodiment of the present disclosure.

The controller 705 controls the general operation of the transmission device. For example, the controller 705 performs processing and control for data communication. In addition to the general function, the controller 705 according to an embodiment of the present disclosure may determine a reception queue state of the reception device and perform beamforming based on the reception queue state.

When the packet delivery rate is smaller than a first threshold value or when a predetermined period arrives, the controller 705 may determine the reception queue state. The controller 705 may determine the reception queue state based on the information about the total available buffer capacity and the current available buffer capacity. The controller 705 may determine the number of packets, which the transmission device has attempted to transmit to the reception device from the first time to the second time, and determine a packet delivery rate of the transmission device from the first time to the second time.

The controller 705 may determine the reception queue state based on the queue level of the reception device, the number of packets attempted to be transmitted, the packet delivery rate, and the information about the number of consumed packets. When the packet delivery rate is smaller than a second threshold value, the controller 705 may determine whether the reception queue level is higher than or equal to a beamforming cost. Here, the second threshold value may be smaller than the first threshold value.

When the reception queue level is lower than the beamforming cost, the controller 705 may change the data transmission rate. When the reception queue level is higher than or equal to the beamforming cost, the controller 705 may perform the beamforming. The controller 705 may perform first beamforming and then second beamforming.

The controller 705 may perform first beamforming of SLS and then second beamforming of BRP. When the reception queue level is lower than the beamforming cost, the controller 705 may perform the second beamforming based on a result of the performance of the first beamforming. The controller 705 may store a sector according to the result of the performance of the first beamforming, perform the beamforming based on the sector, and determine a Transition Probability Matrix (TPM) between the sector according to the result of the performance of the first beamforming and a sector according to a result of the performance of the second beamforming. The controller 705 may determine a section with which the reception device can be connected based on the transition probability without performing the beamforming.

When the packet delivery rate is smaller than the first threshold value, the controller 705 may identify whether the reception queue level of the reception device is smaller than the beamforming cost. When the reception queue level is lower than the beamforming cost, the controller 705 may decrease the size of the first threshold value and the size of an interval in which the packet delivery rate is calculated.

When the reception queue level is higher than or equal to the beamforming cost, the controller 705 may store information about the current sector and perform the beamforming. When a selected sector is the same as the stored current sector based on a result of the performance of the beamforming, the controller 705 may increase the size of the first threshold value and the size of the interval in which the packet delivery rate is calculated. The controller 705 may store the size of the currently set beamforming performance interval, perform the beamforming, and then change the size of the beamforming performance interval to have a smallest value. When the packet delivery rate is smaller than the first threshold value, the controller 705 may perform the beamforming again. When the packet delivery rate is larger than or equal to the first threshold value and the stored size of the beamforming performance interval is larger than the changed size of the beamforming performance interval, the controller 705 may increase the changed size of the beamforming performance interval.

According to an embodiment of the present disclosure, the controller 705 may be configured as illustrated in FIG. 7B. For example, referring to FIG. 7B, the controller 705 may include a link state manager 708, a counterpart device queue state monitor 709, a link state/characteristic monitor 711, a beamforming result learner 713, a Modulation Coding Scheme (MCS) controller 715, a beamforming controller 717, and a channel access controller 719.

The MCS controller 715 makes a control to set a desired MCS among an available MCS set. For example, the MCS set may be a set of transmission rates which can be used by the transmission device. Accordingly, the MCS controller 715 may be referred to as a "transmission rate controller". The beamforming controller 717 controls a predefined beam training process and handles a beamforming protocol. The channel access controller 719 controls channel access between a plurality of reception devices that receive a particular media service. The channel access controller 719 may be referred to as a "Medium Access Control (MAC) unit".

The beamforming result learner 713 is a device that renews a transition probability between a plurality of beams or a plurality of sectors based on a result of the performance of the beamforming and estimates a sector to be used based on the transition probability. The counterpart device queue state monitor 709 monitors a queue state of the counterpart device through a method of directly or indirectly receiving a queue level of the counterpart device that transmits/receives data to/from the transmission device. The link state/characteristic monitor 711 monitors information about a radio signal index or a packet error rate to measure the link state and characteristic. The link state manger 707 controls the MCS controller 715 and the beamforming controller 717 to meet a Quality of Service (QoS) based on a result of the monitoring of the queue state of the counterpart device, a result of the monitoring of the link state and the link characteristic, and QoS requirements, and provide a function of searching for and maintaining a link that meets the QoS.

The input unit 707 may include, for example, a touch panel, a (digital) pen sensor, a key, or an ultrasonic input device. The touch panel may use at least one of, for example, a capacitive type, a resistive type, an infrared type, and an ultrasonic type. Also, the touch panel may further include a control circuit. The touch panel may further include a tactile layer to provide a tactile reaction to the user.

The (digital) pen sensor may be, for example, a part of the touch panel, or may include a separate recognition sheet. The key may include, for example, a physical button, an optical key, or a keypad. The ultrasonic input device may detect microwaves in the transmission device 100 through an input means that generates an ultrasonic signal and identify data.

Figure 8:
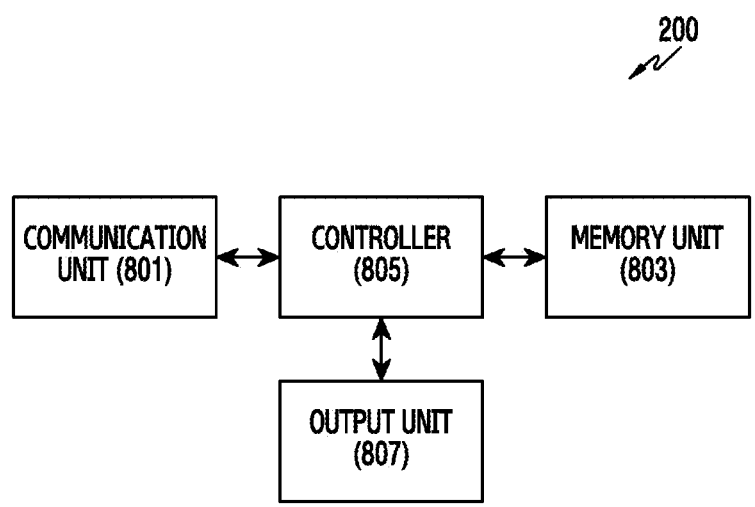
FIG. 8 illustrates the reception device according to an embodiment of the present disclosure.

FIG. 8 illustrates the reception device according to an embodiment of the present disclosure.

Referring to FIG. 8, the reception device 200 may include a communication unit 801, a memory unit 803, a controller 805, and an output unit 807.

For example, the communication unit 801 performs a function of processing transmission/reception of a wireless signal of data input/output through an antenna (not shown). For example, in a case of transmission, data to be transmitted is subjected to channel coding, spreading, and then RF processing, and is transmitted. In a case of reception, a received RF signal is converted into a baseband signal, and the baseband signal is de-spread and channel-decoded, and thus data is reconstructed.

In addition to the general function, according to an embodiment of the present disclosure, the communication unit 801 may transmit information for determining whether to perform beamforming to the transmission device and receive data from the transmission device through at least one link formed based on the information for determining whether to the beamforming.

The memory unit 803 stores micro codes of a program for processing and control by the controller 705 and various pieces reference data. In addition to the general function, the memory unit 803 according to an embodiment of the present disclosure may store information for determining whether to perform the beamforming. The information for determining whether to perform the beamforming may include at least one of a size of a total available buffer, a size of a buffer which the reception device can currently use, information about a reception queue level of a first time, and a number of packets consumed from the first time to a second time.

The controller 805 controls the general operation of the transmission device. For example, the controller 805 performs processing and control for data communication.

The output unit 807 may include a video output unit and an audio output unit. The output unit 807 may provide visual or auditory output to the user. For example, the output unit 807 may output data received from the transmission device 100. The data may be expressed in the form of text, graphics, video, audio data, or a combination thereof.

The video output unit may include a panel, a hologram device, or a projector. The panel may be embodied to be, for example, flexible, transparent, or wearable. The panel may be formed as a single module with a touch panel. The hologram device may show a three-dimensional image in the air using interference of light. The projector may display an image by projecting light onto a screen. The screen may be located, for example, inside or outside the reception device 200. According to an embodiment, the video output unit may further include a control circuit for controlling the panel, the hologram device, or the projector.

The audio output unit may convert, for example, a sound into an electrical signal, and vice versa. The audio output unit may process sound information input or output through, for example, a speaker, a receiver, earphones, or a microphone.

Figure 9:
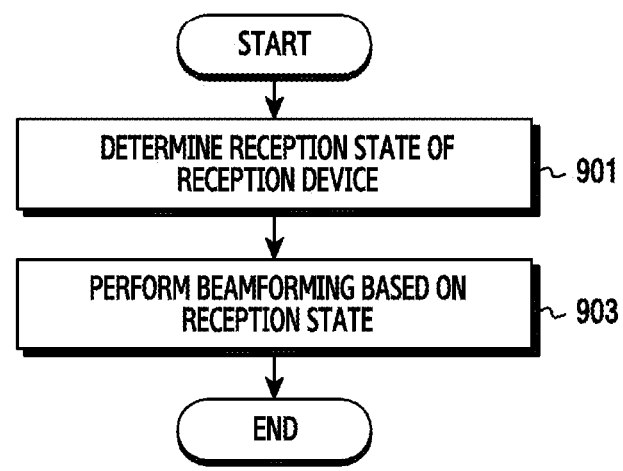
FIG. 9 illustrates an operation of the transmission device according to an embodiment of the present disclosure.

FIG. 9 illustrates an operation of the transmission device according to an embodiment of the present disclosure.

Referring to FIG. 9, the transmission device 100 determines a reception state of the reception device 200 in step 901. When the packet delivery rate is smaller than a first threshold value or when a predetermined period arrives, the transmission device 100 may determine the reception state. The transmission device 100 may determine the reception state based on information about a total available buffer capacity and a current available buffer capacity.

The transmission device 100 may receive the information about the total available buffer capacity and the current available buffer capacity of the reception device 200 from the reception device 200. The transmission device 100 may determine the reception state based on a transmission queue level of the transmission device 100, a reception queue level indicating the reception state of the reception device 200, a number of packets that the transmission device 100 attempted to transmit to the reception device 200, a packet delivery rate, and information about a number of packets consumed by the reception device 200. The reception device 100 may receive information about the queue level of the reception device 200 at a first time from the reception device 200, determine the number of packets that the transmission device 100 attempted to transmit to the reception device 200 from the first time to a second time and the packet delivery rate from the first time to the second time, and receive information about the number of packets consumed by the reception device 200 from the first time to the second time.

When the packet delivery rate is smaller than the first threshold value, the transmission device 100 may identify whether the reception queue level of the reception device 200 is smaller than a beamforming cost. When the reception queue level is lower than the beamforming cost, the transmission device 100 may decrease the size of the first threshold value and the size of an interval in which the packet delivery rate is calculated. When the reception queue level is higher than or equal to the beamforming cost, the transmission device 100 may store information about a current sector and perform beamforming.

When a selected sector is the same as the stored current sector based on a result of the performance of the beamforming, the transmission device 100 may increase the size of the first threshold value and the size of the interval in which the packet delivery rate is calculated. The transmission device 100 may store the size of the currently set beamforming performance interval, perform the beamforming, and then change the size of the beamforming performance interval to a minimum value. When the packet delivery rate is smaller than the first threshold value, the transmission device 100 may perform the beamforming again. When the packet delivery rate is larger than or equal to the first threshold value and the stored size of the beamforming performance interval is larger than the changed size of the beamforming performance interval, the controller 100 may increase the changed size of the beamforming performance interval.

The transmission device 100 performs the beamforming based on a state of the reception device 200 in step 903. The transmission device 100 may perform the beamforming when the reception queue level is higher than or equal to the beamforming cost. When the reception queue level is lower than the beamforming cost, the transmission device 100 may change the data transmission rate. When the packet delivery rate is smaller than a second threshold value, the transmission device 100 may determine whether the reception queue level is higher than or equal to the beamforming cost. The second threshold value may be smaller than the first threshold value.

The transmission device 100 may perform first beamforming and second beamforming. The transmission device 100 may perform beamforming on a first sector when performing the first beamforming, store a result of the performance of the beamforming on the first sector, and perform beamforming on a second sector. The first sector may include the second sector. When the reception queue level is lower than the beamforming cost, the transmission device 100 may perform the second beamforming for the beamforming on the second sector based on the result of the performance of the beamforming on the first sector.

The transmission device 100 may store information about the first sector according to the result of the performance of the first beamforming when performing the second beamforming, perform beamforming on a third sector, which is the same unit as the first sector, determine a prior probability based on information about the third sector, determine a likelihood ratio based on a result of the calculation of the prior probability, and determine a transition probability between the first sector and the third sector based on the determined likelihood ratio.

When performing the second beamforming, the transmission device 100 may determine a fourth sector which can be connected to the reception device based on the transition probability between the first sector and the third sector. The fourth sector may be a sector which is the same unit as the second sector.

Figure 10:
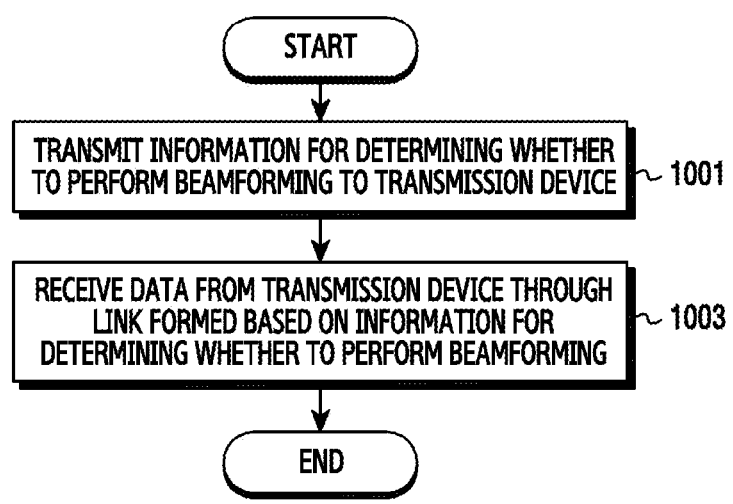
FIG. 10 illustrates an operation of the reception device according to an embodiment of the present disclosure.

FIG. 10 illustrates an operation of the reception device according to an embodiment of the present disclosure.

Referring to FIG. 10, the reception device 200 transmits information for determining whether to perform beamforming to the transmission device 100 in step 1001. The information for determining whether to perform the beamforming may include at least one of a size of a total available buffer which the reception device 200 can use, a size of a buffer which the reception device 200 can currently use, information about a reception queue level of a first time, and a number of packets consumed from the first time to a second time.

The reception device 200 may receive data from the transmission device 100 through at least one link formed based on the information for determining whether to perform the beamforming in step 1003. The reception device 200 may transmit/receive data to/from the transmission device 100 through at least one link which the transmission device 100 determines based on the information for determining whether to perform the beamforming. According to another embodiment of the present disclosure, the link may be referred to as a beam.

Figure 11A:
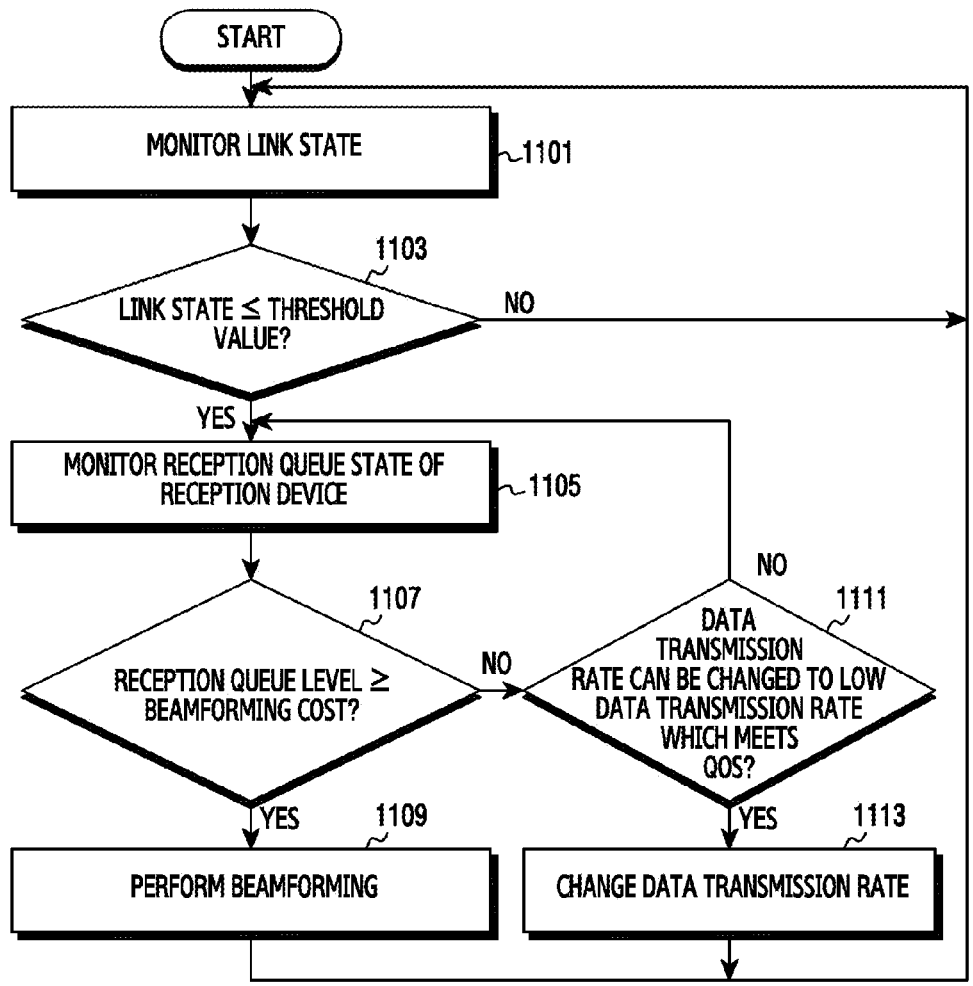
FIGS. 11A and 11B illustrate a process in which the transmission device or the reception device determines whether to perform beamforming according to an embodiment of the present disclosure.
Figure 11B:
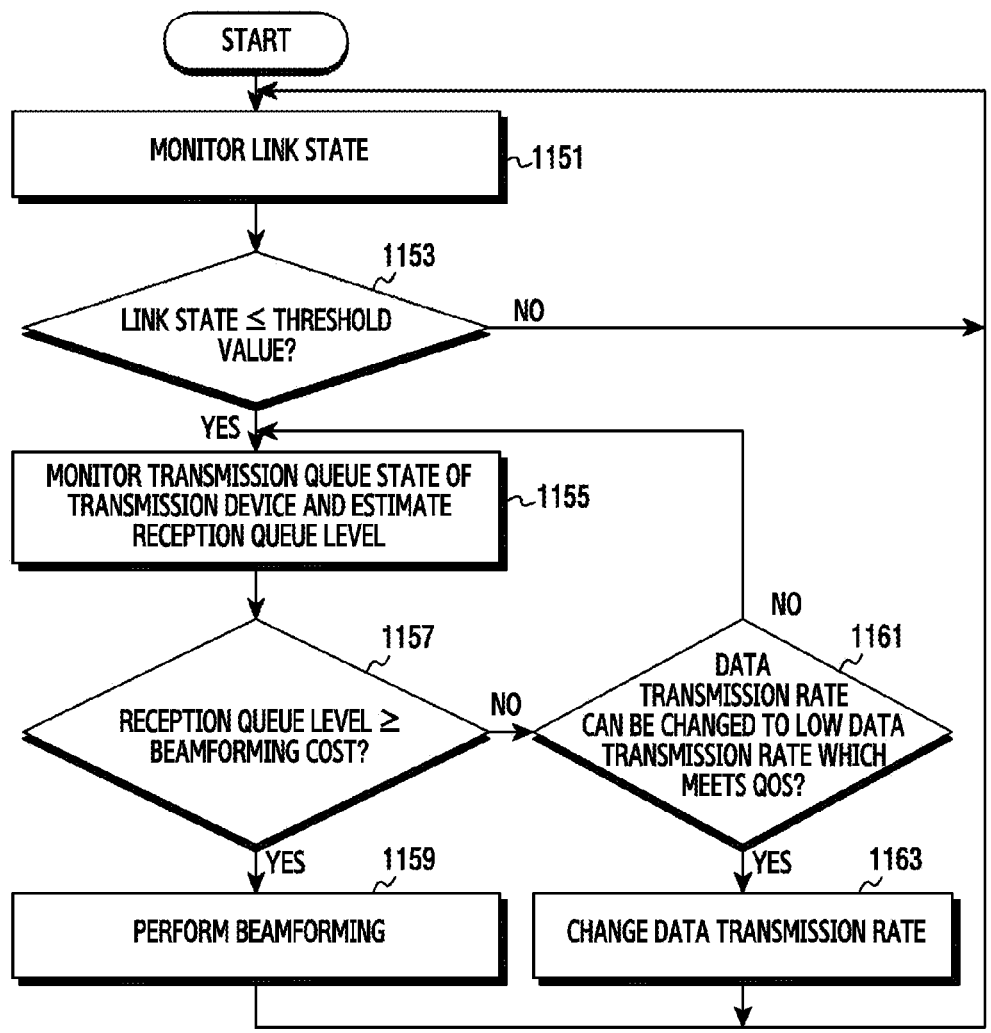

FIGS. 11A and 11B illustrate a process in which the transmission device or the reception device determines whether to perform beamforming according to an embodiment of the present disclosure.

Referring to FIG. 11A, the transmission device 100 monitors a link state between the transmission device 100 and the reception device 200 in step 1101. According to an embodiment of the present disclosure, a plurality of links may be formed between the transmission device 100 and the reception device 200 which use a plurality of antennas. The transmission device 100 may monitor a state of each of the plurality of links. For example, the transmission device 100 may monitor the state of each of the plurality of links through a radio index such as an RSSI and an SNR or a packet error rate of each of the plurality of links.

According to another embodiment of the present disclosure, the transmission device 100 may monitor the state of each of the plurality of links based on a change in the packet error rate of each of the plurality of links, a change in the RSSI, and a change in the SNR.

The transmission device 100 determines whether the state of at least one of the plurality of links deteriorates in step 1103. For example, when the packet error rate of at least one link is smaller than a predetermined threshold value, the transmission device 100 may determine that the state of at least one link has deteriorated. When at least one link having the packet error rate, which is smaller than the predetermined threshold value, does not exist, the transmission device 100 may return to step 1101 and monitor the states of the plurality of links.

According to an embodiment of the present disclosure, when the packet error rate of at least one link is smaller than the predetermined threshold value, the transmission device 100 monitors the reception state of the reception device 200 in step 1105. For example, the transmission device 100 may identify the reception queue level of the reception device 200 through a direct method or an indirect method. The direct method or the indirect method will be described in detail with reference to FIG. 13 below.

Referring to FIG. 11B, according to another embodiment of the present disclosure, when the packet error rate of at least one link is smaller than the predetermined threshold value, the transmission device 100 monitors a transmission queue state of the transmission device 100 and estimates the reception queue level in step 1155. The transmission device 100 may estimate the reception queue level based on the transmission queue level of the transmission device 100. For example, when the transmission queue level is high, the transmission device 100 may determine that the reception queue level of the reception device 200 is low. For example, the transmission device 100 may estimate the reception queue level of the reception device 200 based on the transmission queue level of the transmission device 100 and whether the transmission queue level exceeds each predetermined threshold.

According to an embodiment of the present disclosure, the transmission device 100 determines whether the reception queue level is higher than or equal to a beamforming cost in step 1157. The beamforming cost refers to a time spent for performing the beamforming. That is, the transmission device 100 may determine whether the reception queue level does not become zero while the beamforming is performed.

According to another embodiment of the present disclosure, the transmission device 100 may determine whether to perform the beamforming based on at least one of a change in the transmission queue level and a change in the reception queue level.

When the reception queue level is higher than or equal to the beamforming cost, the transmission device 100 performs the beamforming in step 1159. That is, when it is determined that the reception queue level does not become zero while the beamforming is performed, the transmission device 100 may perform the beamforming.

When the reception queue level is lower than the beamforming cost, the transmission device 100 identifies whether the data transmission rate can be changed to a low data transmission rate, which meets QoS, in step 1161. When the data transmission rate cannot be changed to the data transmission rate, which meets the QoS, the transmission device 100 may return to step 1155 and monitor the reception queue state.

When the data transmission rate can be changed to the low data transmission rate, which meets the QoS, the transmission device 100 changes the data transmission rate to the low data transmission rate, which meets the QoS, in step 1163. That is, as the transmission device 100 changes the data transmission rate, thereby preventing packet reception of the reception device 200 from being disconnected in spite of a low data transmission rate.

That is, when it is difficult to perform the beamforming due to the high beamforming cost, the transmission device 100 may reduce the data transmission rate to prevent the service provided to the reception device 200 from being not disconnected. According to another embodiment of the present disclosure, the transmission device 100 may control the data transmission rate by changing a Modulation Coding Scheme (MCS). For example, when a data transmission rate required for providing a streaming service is larger than or equal to 1 Gbps, the data transmission rate may be 2 Gbps if the MCS of the transmission device 100 is set as 12 and the data transmission rate may be 1 Gbps if the MCS is set as 10. At this time, the MCS set, which can be used while the QoS is maintained, corresponds to MCS 10 to MCS 12. When the beamforming is performed, the reception queue may not exist due to the high beamforming cost, so that the transmission device 100 may change the MCS without performing the beamforming. For example, when the MCS is set as 11 or higher, the transmission device 100 may change the MCS to 10.

Figure 12A:
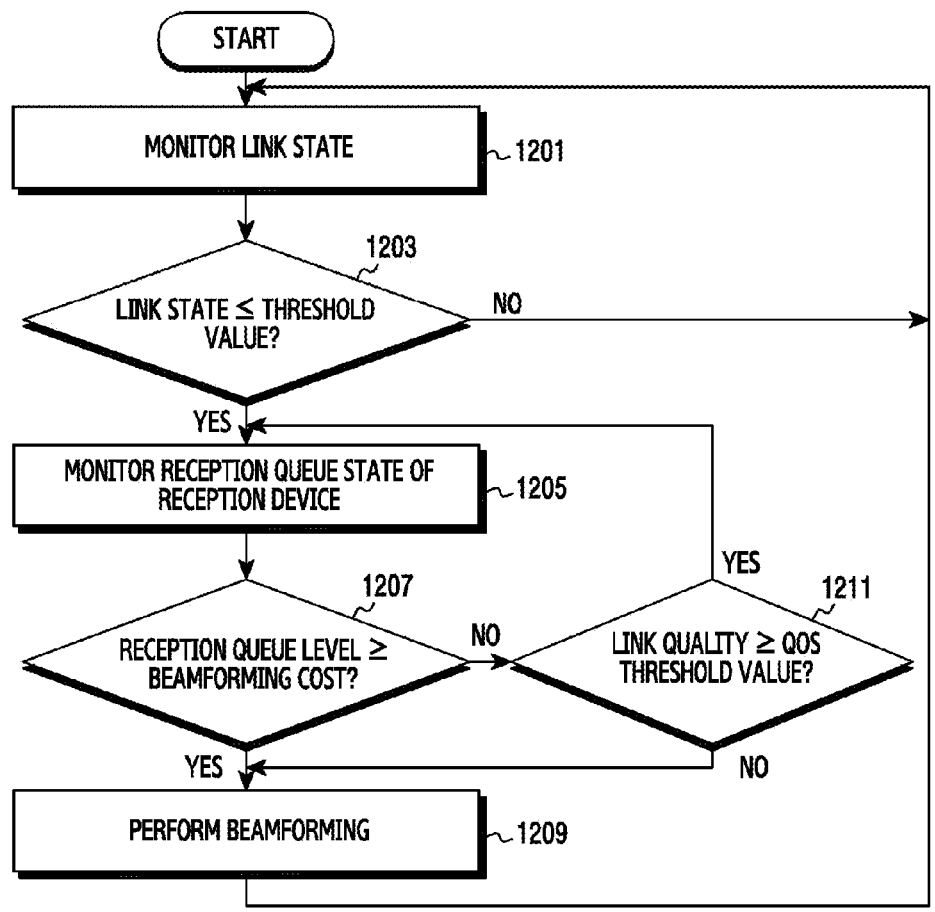
FIGS. 12A and 12B illustrate a process in which the transmission device and the reception device determine whether to perform beamforming according to another embodiment of the present disclosure.
Figure 12B:
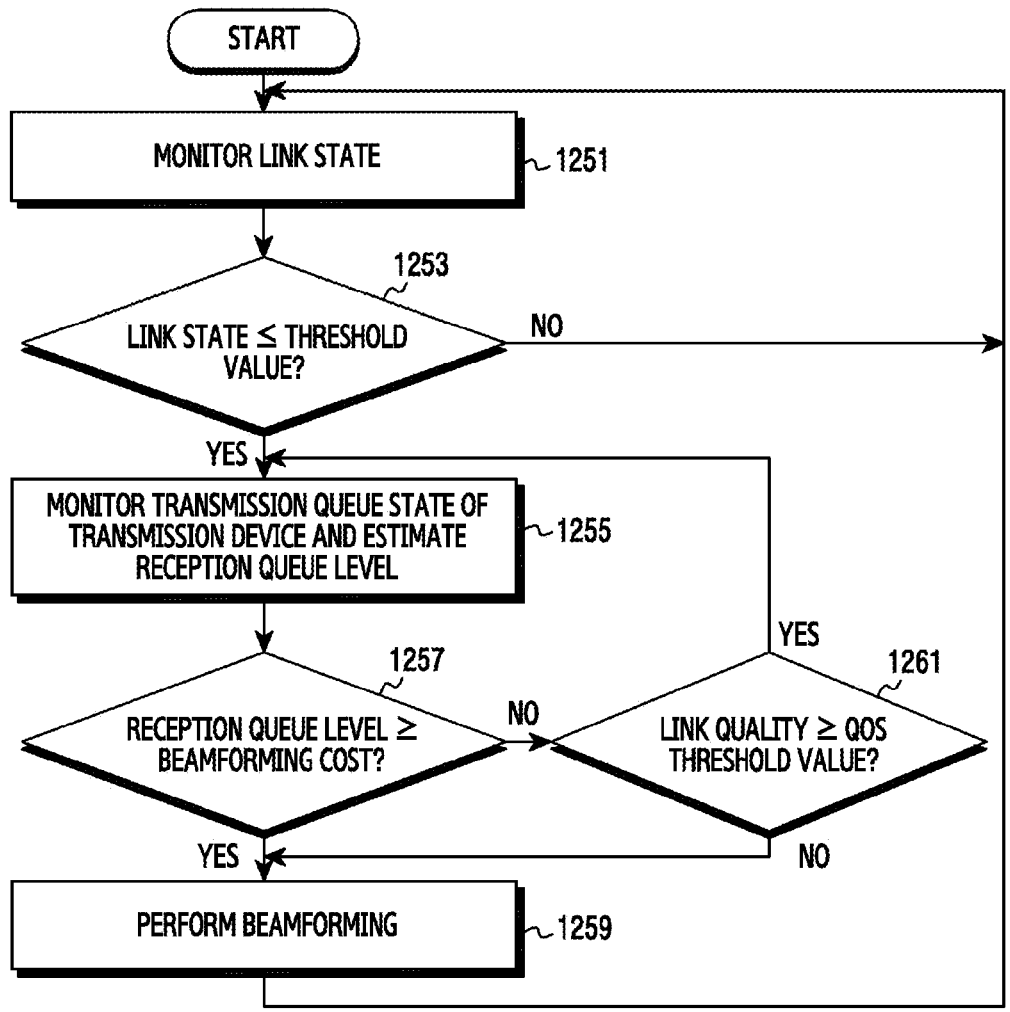

FIGS. 12A and 12B illustrate a process in which the transmission device and the reception device determine whether to perform beamforming according to another embodiment of the present disclosure.

Referring to FIG. 12A, the transmission device 100 monitors a link state between the transmission device 100 and the reception device 200 in step 1201. According to an embodiment of the present disclosure, a plurality of links may be formed between the transmission device 100 and the reception device 200 which use a plurality of antennas. The transmission device 100 may monitor a state of each of the plurality of links. For example, the transmission device 100 may monitor the state of each of the plurality of links through a radio index such as an RSSI and an SNR or a packet error rate of each of the plurality of links.

According to another embodiment of the present disclosure, the transmission device 100 may monitor the state of each of the plurality of links based on a change in the packet error rate of each of the plurality of links, a change in the RSSI, and a change in the SNR.

The transmission device 100 determines whether the link state of at least one of the plurality of links deteriorates in step 1203. For example, when the packet error rate of at least one link is smaller than a predetermined threshold value, the transmission device 100 may determine that the state of at least one link has deteriorated. When at least one link having the packet error rate, which is smaller than the predetermined threshold value, does not exist, the transmission device 100 may return to step 1201 and monitor the states of the plurality of links.

According to an embodiment of the present disclosure, when the packet error rate of at least one link is smaller than the predetermined threshold value, the transmission device 100 monitors the reception state of the reception device 200 in step 1205. For example, the transmission device 100 may identify the reception queue level of the reception device 200 directly or indirectly. The direct method or the indirect method will be described in detail with reference to FIG. 13 below.

Referring to FIG. 12B, according to another embodiment of the present disclosure, when the packet error rate of at least one link is smaller than the predetermined threshold value, the transmission device 100 monitors a transmission queue state of the transmission device 100 and estimates the reception queue level in step 1255. The transmission device 100 may estimate the reception queue level based on the transmission queue level of the transmission device 100. For example, when the transmission queue level is high, the transmission device 100 may determine that the reception queue level of the reception device 200 is low. For example, the transmission device 100 may estimate the reception queue level of the reception device 200 based on the transmission queue level of the transmission device 100 and whether the transmission queue level exceeds each predetermined threshold.

The transmission device 100 determines whether the reception queue level is higher than or equal to a beamforming cost in step 1257. The beamforming cost refers to a time spent for performing the beamforming. That is, the transmission device 100 may determine whether the reception queue level does not become zero while the beamforming is performed.

According to another embodiment of the present disclosure, the transmission device 100 may determine whether to perform the beamforming based on at least one of a change in the transmission queue level and a change in the reception queue level.

When the reception queue level is higher than or equal to the beamforming cost, the transmission device 100 performs the beamforming in step 1259. That is, when it is determined that the reception queue level does not become zero while the beamforming is performed, the transmission device 100 may perform the beamforming.

When the reception queue level is lower than the beamforming cost, the transmission device 100 identifies whether the packet delivery rate is larger than or equal to a predetermined QoS threshold value in step 1261. When the packet delivery rate is larger than or equal to the predetermined QoS threshold value, the transmission device 100 returns step 1255 and monitors the reception queue level.

When the packet delivery rate is smaller than the predetermined QoS threshold value, the transmission device 100 performs the beamforming in step 1259. That is, according to an embodiment of the present disclosure, the transmission device 100 does not perform beamforming when the reception queue level is higher than or equal to the QoS threshold value, and may perform the beamforming only when the reception queue level is lower than the QoS threshold value.

Figure 13A:
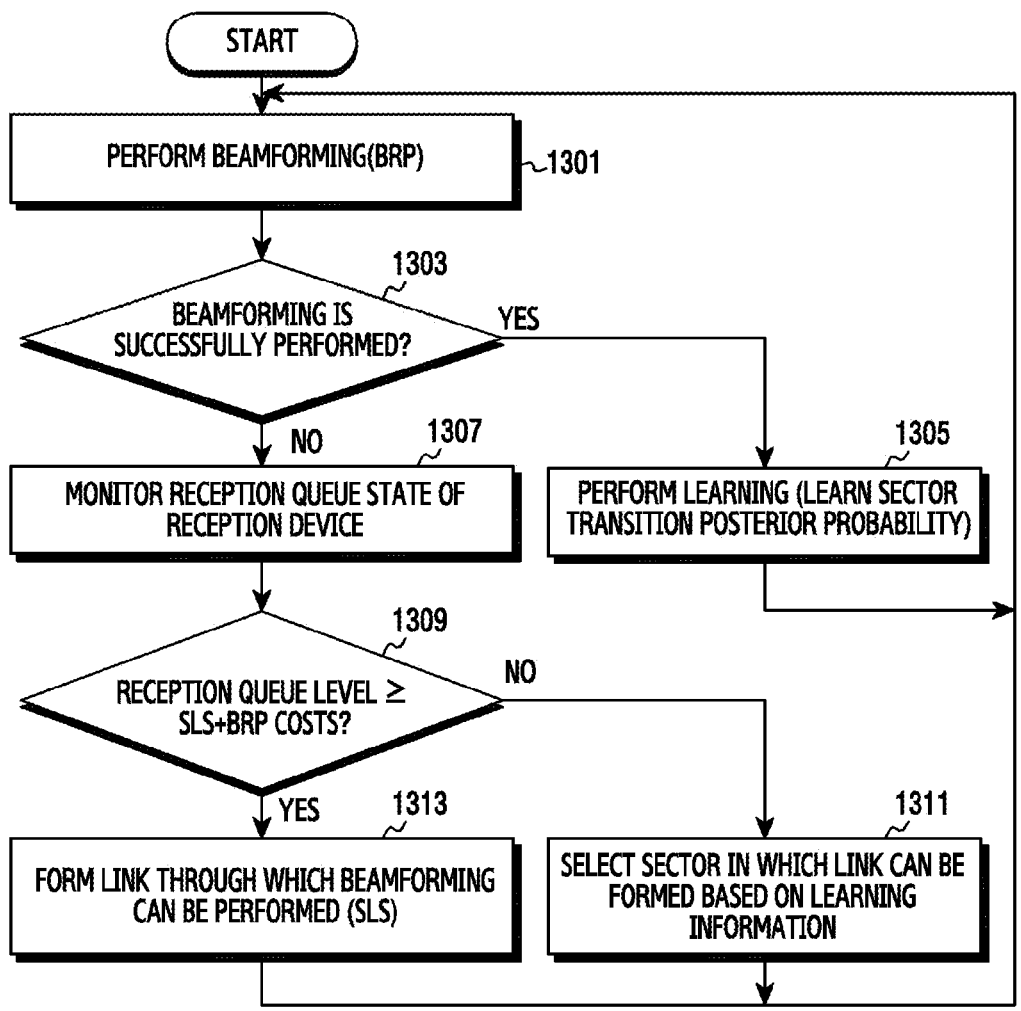
FIGS. 13A and 13B illustrate a process in which the transmission device performs beamforming according to an embodiment of the present disclosure.
Figure 13B:
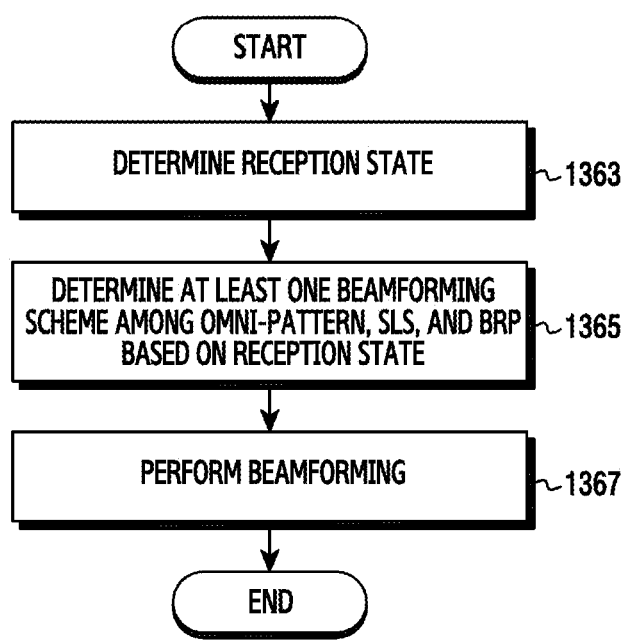

FIGS. 13A and 13B illustrate a process in which the transmission device performs beamforming according to an embodiment of the present disclosure.

Referring to FIG. 13A, the transmission device 100 performs beamforming in step 1301. The transmission device 100 having a plurality of antennas according to an embodiment of the present disclosure may perform the beamforming including Sector Level Sweep (SLS) and Beam Refinement Protocol (BRP).

The SLS refers to a protocol that forms a link. The SLS corresponds to a method in which the transmission device 100 performs an operation for changing directions of beams through an antenna array including the plurality of antennas and transmitting frames containing the same contents in the changed directions, respectively. For example, the transmission device 100 may identify the frame received by the reception device 200 among the frames transmitted in their directions. The transmission device 100 may identify an SNR and an RSSI that indicate a capability of a link through which the received frame is delivered. The transmission device 100 may identify a link having the highest capability through the SNR and the RSSI and identify a direction of the beam that forms the link.

The BRP corresponds to a method of minutely adjusting the direction of the beam to make the packet delivery rate maximal in the direction of the beam having the highest capability, which has been identified through the SLS. For example, when the BRP is performed, the transmission device 100 may minutely adjust the direction of the beam by using a predefined BRP frame to the BRP. The BRP frame includes information for beamforming and information for reporting a result of the beamforming. The BRP frame may be transmitted to the transmission device 100 through the beam determined by means of the existing beamforming. When receiving the BRP frame, the transmission device 100 may use a training sequence included in the last part of the BRP frame for the beam training. Unlike the SLS using the frame itself for the beamforming, the BRP uses only the training sequence in a simple structure. Accordingly, the transmission device 100 may perform the beamforming only when the BRP is received. The beamforming may be referred to as beam training.

The transmission device 100 may find a sector for transmitting the BRP frame to a control physical layer through the SLS. That is, the transmission device may form a control physical layer link through the SLS. The transmission device 100 may select an optimal beam direction by using beamforming or a beam training field of the BRP through the BRP. Processes of the SLS and the BRP are different from each other. For example, it takes about 1200 μs for the SLS and about 200 μs for the BRP based on 20 sectors.

The transmission device 100 may perform the BRP only when the predetermined BRP frame is received. Accordingly, when the control physical layer link for transmitting/receiving the BRP is not formed, the transmission device 100 cannot perform the BRP. When the transmission device 100 cannot perform a first BRP, the transmission device 100 may perform the SLS again. The transmission device 100 may perform a second BRP by forming the physical control layer link again through the SLS. At this time, as the transmission device 100 performs each of the SLS and the second BRP again, the transmission device 100 has an increased beamforming time. For example, when the transmission device 100 cannot perform the first BRP, a beamforming cost of about 200 μs may be generated for the first BRP, a beamforming cost of about 1200 μs may be generated for performing the SLS again, and a beamforming cost of about 200 μs may be generated for performing the second BRL again. As a result, beamforming costs of a total of about 1600 μs may be generated. In contrast, when the transmission device succeeds in the first BRP, only the beamforming cost of about 200 μs for the first BRL may be generated. In other words, a beamforming cost generated when the transmission device 100 fails in the first BRP, is eight times larger than that generated when the first BRP is successfully performed may be generated. That is, the reception queue level during the increased beamforming costs may decrease and become zero. Accordingly, when the reception queue level is lower than a predetermined reference, the transmission device 100 may perform the BRP without performing the SLS according to an embodiment of the present disclosure.

The transmission device 100 determines whether the beamforming is successful in step 1303. When the transmission device 100 receives an identifier of a reception beam to be used by the reception device 200 and information about a direction of the reception beam from the reception device 200 within a predetermined time interval, the transmission device 100 may determine that the beamforming has been successfully performed.

When the beamforming is successfully performed, the transmission device 100 performs sector transition posterior probability learning in step 1305. The transmission device 100 returns to step 1301 after performing the sector transition posterior probability learning.

When the performance of beamforming fails, the transmission device 100 monitors the reception queue state of the reception device 200 in step 1307. The transmission device 100 may identify the reception queue level. An example in which the transmission device 100 identifies the reception queue level will be described in detail with reference to FIGS. 17 to 20 below.

The transmission device 100 determines whether the reception queue level is sufficiently high in step 1309. The transmission device 100 may determine whether the reception queue level is higher than or equal to a sum of costs for performing SLS and BRP. When the reception queue level is higher than or equal to the sum of the costs for performing the SLS and the BRP, the transmission device 100 may determine that the reception queue level is sufficiently high.

When the reception queue level is higher than or equal to the sum of the costs for performing the SLS and the BRP, the transmission device 100 forms a link through which beamforming can be performed in step 1311. When it is determined that the reception queue level is enough to not be zero while the SLS is performed, the transmission device 100 may form the link through which the beamforming can be performed through the SLS.

When the reception queue level is lower than the sum of the costs for performing the SLS and the BRP, the transmission device 100 selects a sector in which the link can be formed based on learning information in step 1313. The learning information refers to information about the sector determined through the existing SLS. When the reception queue level is not enough to perform the SLS again, the transmission device 100 may select one sector from one or more sectors determined through the existing SLS to from the link without performing the SLS.

Referring to FIG. 13B, the transmission device 100 determines a reception state in step 1363. For example, the transmission device 100 may receive information about the reception state from the reception device 200. The information about the reception state may include at least one of a reception queue level, a sector identifier, and a currently used beam width. Further, the information about the reception state may further include at least one of a CQI, a Signal to Noise Ratio (SNR), and a Received Signal Strength Indicator (RSSI).

The transmission device 100 determines one beamforming method of an omni-pattern, SLS, and BRP based on the reception state in step 1365. The omni-pattern beamforming method refers to a method of using an omni-directional antenna beam pattern to time-efficiently perform a beamforming training process compared to using only a direction antenna beam pattern. For example, when there are 20 sectors and the transmission device 100 performs general beamforming without using the omni-pattern, the transmission device 100 should consider all combinations of 20 transmission beamformings for the 20 sectors and 20 reception beamformings for the 20 sectors performed by the reception device 200. That is, the transmission device 100 should perform a total of 400 beamformings corresponding to the number of cases of the 20 reception beamformings for the 20 transmission beamformings. In contrast, in a case of the omni-pattern, the transmission device 100 may perform a total of 40 beamformings corresponding to the 20 beamformings for the 20 sectors for the transmission beam and the 20 beamformings for the 20 sectors for the reception beam. That is, when the transmission device 100 performs the omni-pattern beamforming, the transmission device 100 may perform the beamforming within a time shorter than that of the general beamforming. However, in the case of the omni-pattern, an antenna gain from the viewpoint of the side applying the omni-pattern decreases, so that a distance in which the beamforming is possible may decrease. Further, in the case of the omni-pattern, when a beam characteristic is not ideal, an optimal beam may not be selected. Accordingly, based on an available time for which the beamforming can be performed, the transmission device 100 may perform the general beamforming when the available time is sufficient and perform the omni-pattern beamforming when the available time is not sufficient.

The transmission device 100 may determine the beamforming method based on a time which the transmission device 100 can use for the beamforming. For example, the transmission device 100 may determine the time which can be used for the beamforming based on the reception queue level. For example, the transmission device 100 may determine a time for which there is no data pending in a reception buffer based on the reception queue level. That is, the transmission device 100 may determine the time for which there is no data pending in the reception buffer as the time which can be used for the beamforming based on the reception queue level.

The transmission device 100 may determine at least one beamforming method of the BRP and the SLS based on the time which can be used for the beamforming. For example, when the time which can be used for the beamforming is longer than a predefined threshold value, the transmission device 100 may determine to perform the SLS. In contrast, when the time which can be used for the beamforming is equal to or shorter than the predefined threshold value, the transmission device 100 may determine to perform the BRP. The transmission device 100 may determine at least one of a beam width for the beamforming, a number of beams, and a set of beams based on the time which can be used for the beamforming.

Further, the transmission device 100 may determine the beamforming method based on a capacity of data currently transmitted/received. For example, the transmission device 100 may transmit/receive high capacity data. At this time, the transmission device 100 may determine the beamforming method as at least one of the SLS and the BRP to transmit/receive the high capacity data through an accurate beam. In contrast, the transmission device 100 may transmit/receive low capacity data. At this time, the transmission device 100 may determine the beamforming method as the omni-pattern in order to make a quick response.

The transmission device 100 performs beamforming in step 1367. The transmission device 100 performs beamforming according to determined beamforming method among the omni-pattern, SLS, and BRP.

Figure 14:
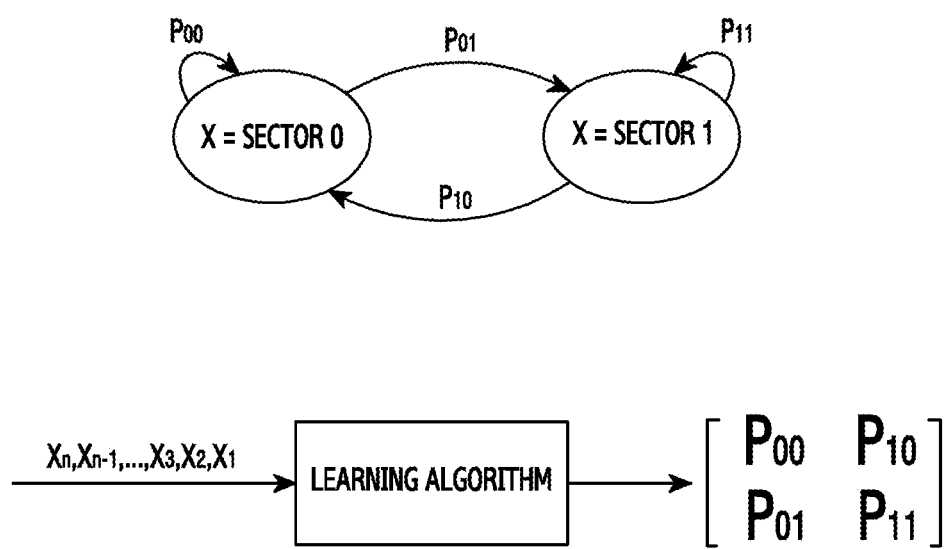
FIG. 14 illustrates a state transition between sectors occurring when the transmission device or the reception device performs beamforming according to an embodiment of the present disclosure.

FIG. 14 illustrates a state transition between sectors occurring when the transmission device or the reception device performs beamforming according to an embodiment of the present disclosure.

Referring to FIG. 14, P00 refers to a probability of transition of a beam or a sector from sector #0 to sector #0. For example, P01 refers to a probability that a result of the beamforming or beam training process is sector #0 when a current sector is sector #0. The transmission device 100 may determine a probability that a sector to be selected next based on sector #0 becomes sector #0 or sector #1. For example, the transmission device 100 may calculate the probability based on a Markovian system.

When the beamforming is performed based on the Markovian system, the transmission device 100 may estimate a second sector which can be determined through second beamforming in a first sector determined through first beamforming. That is, the transmission device 100 may determine a Transition Probability Matrix (TPM) between the first sector and the second sector. The transmission device 100 may select the second sector based on the first sector, which is determined through the first beamforming, regardless of a sector determined before the first beamforming. For example, when the current sector is the first sector, the transmission device 100 may search for another sector by performing the second beamforming based on the first sector regardless of the previously determined sector if it is determined that a state of the first sector deteriorates based on the first sector. Xn, Xn-1, . . . , X3, X2, X1 of FIG. 14 refer to random probability parameters and correspond to the sector determined through the beamforming by the transmission device 100 or a state of the sector. The transmission device 100 may determine a transition probability between the sector determined through sequential beamforming results based on a Bayesian learning algorithm, another statistical learning algorithm, or a learning algorithm by which the sector TPM can be acquired. According to another embodiment of the present disclosure, the transmission device 100 may determine the transition probability between the sectors through a statistical estimation method.

Figure 15:
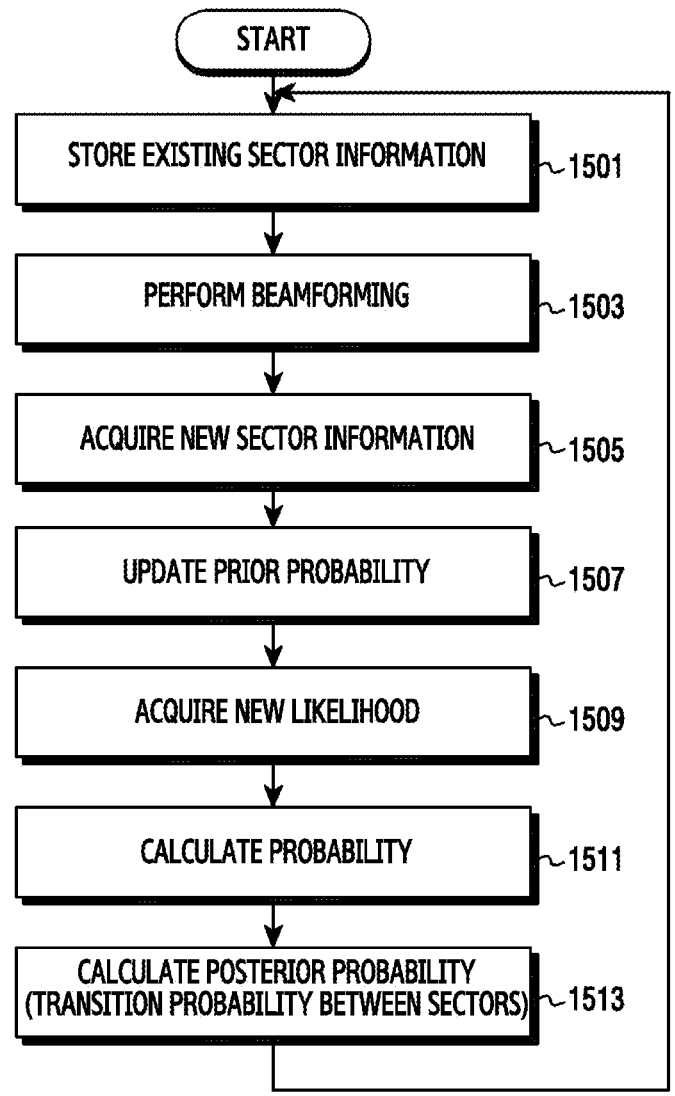
FIG. 15 illustrates a process in which the transmission device calculates a posterior probability according to an embodiment of the present disclosure.

FIG. 15 illustrates a process in which the transmission device calculates a posterior probability according to an embodiment of the present disclosure.

Referring to FIG. 15, the transmission device 100 stores existing sector information in step 1501. The transmission device 100 may store information about at least one sector found through the existing SLS.

The transmission device 100 performs beamforming in step 1503. The transmission device 100 may search for a new sector through the SLS.

The transmission device 100 acquires information about the new sector in step 1505. The transmission device 100 may acquire the information about the new sector found through the beamforming.

The transmission device 100 updates a prior probability in step 1507. For example, the transmission device 100 may update the prior probability through equation (1) below.

$$TMP=\{P_{ij}:i,j \in X\}$$

$$TPM, P(\theta) \in PS(X)$$

$$P_n(\theta)=P_{n-1}(\theta|X_{n-1}=x) \text{ for } \forall \theta \quad (1)$$

X is defined as a finite value and PS(X) is defined as a probability space in X. X1, X2, X3, . . . are defined as a Markov chain in X along with the TPM. P($\theta$) is defined as the prior probability in the TPM. The transmission device 100 may determine the TPM through a Bayesian inference method.

The transmission device 100 acquires a new likelihood in step 1509. For example, the transmission device 100 may calculate the new likelihood through equation (2) below.

$$P_n(X_n=i|\theta) \text{ for } \forall \theta \quad (2)$$

In equation (2), denotes optimal sector information (i) acquired in an nth sector level sweep beam training process.

The transmission device 100 calculates a marginal probability in step 1511. For example, the transmission device 100 may calculate the probability through equation (3) below.

$$\sum_{\forall \theta} P_n(X_n = i \mid \theta) * P_n(\theta) \qquad (3)$$

The transmission device 100 may calculate a posterior probability in step 1513. The transmission device 100 may calculate the posterior probability, that is, a transition probability between sectors. For example, the transmission device 100 may calculate the posterior probability through equation (4) below.

$$P_n(\theta \mid X_n = i) = \frac{P_n(X_n = i \mid \theta) * P_n(\theta)}{\sum_{\forall \theta} P_n(X_n = i \mid \theta) * P_n(\theta)} \text{ for } \forall \theta \qquad (4)$$

Figure 16:
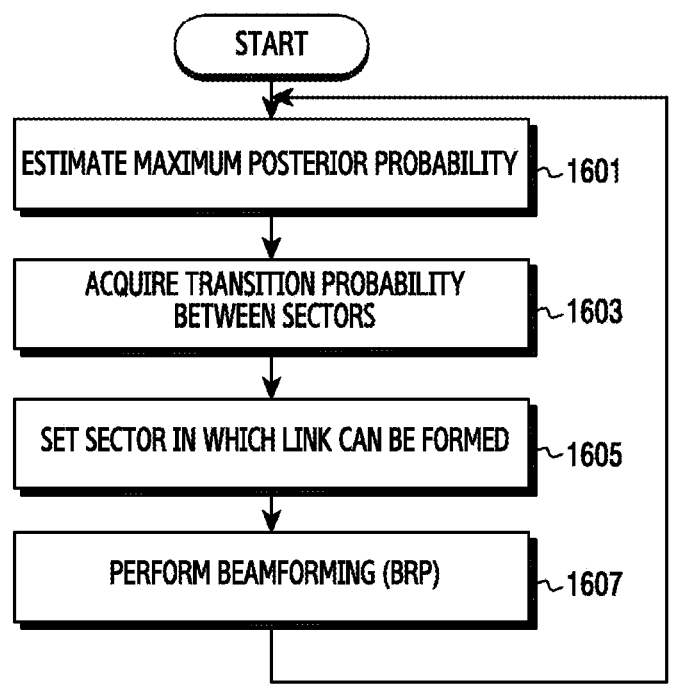
FIG. 16 illustrates a process in which the transmission device performs a BRP without performing an SLS according to an embodiment of the present disclosure.

FIG. 16 illustrates a process in which the transmission device performs the BRP without performing the SLS according to an embodiment of the present disclosure.

Referring to FIG. 16, the transmission device 100 estimates a maximum posterior probability in step 1601. For example, the transmission device 100 may calculate the maximum posterior probability through equation (5) below.

$$\max_\theta P_n(\theta \mid X = x) \qquad (5)$$

The transmission device 100 may determine the TPM through MAP measurement.

The transmission device 100 acquires a transition probability between sectors in step 1603. The transmission device 100 may calculate the transition probability between sectors based on the TPM. According to an embodiment of the present disclosure, the transmission device 100 may reset the prior probability when the calculation fails.

The transmission device 100 sets a sector that can form a link in step 1605. The transmission device 100 may determine a sector that can form a link with the reception device 200 based on results of the calculation of the maximum posterior probability and the transition probability between sectors.

The transmission device 100 performs beamforming in step 1607. The transmission device 100 may perform the BRP based on the sector, which is determined based on the result of the transition probability between sectors, without performing the SLS.

Figure 17:
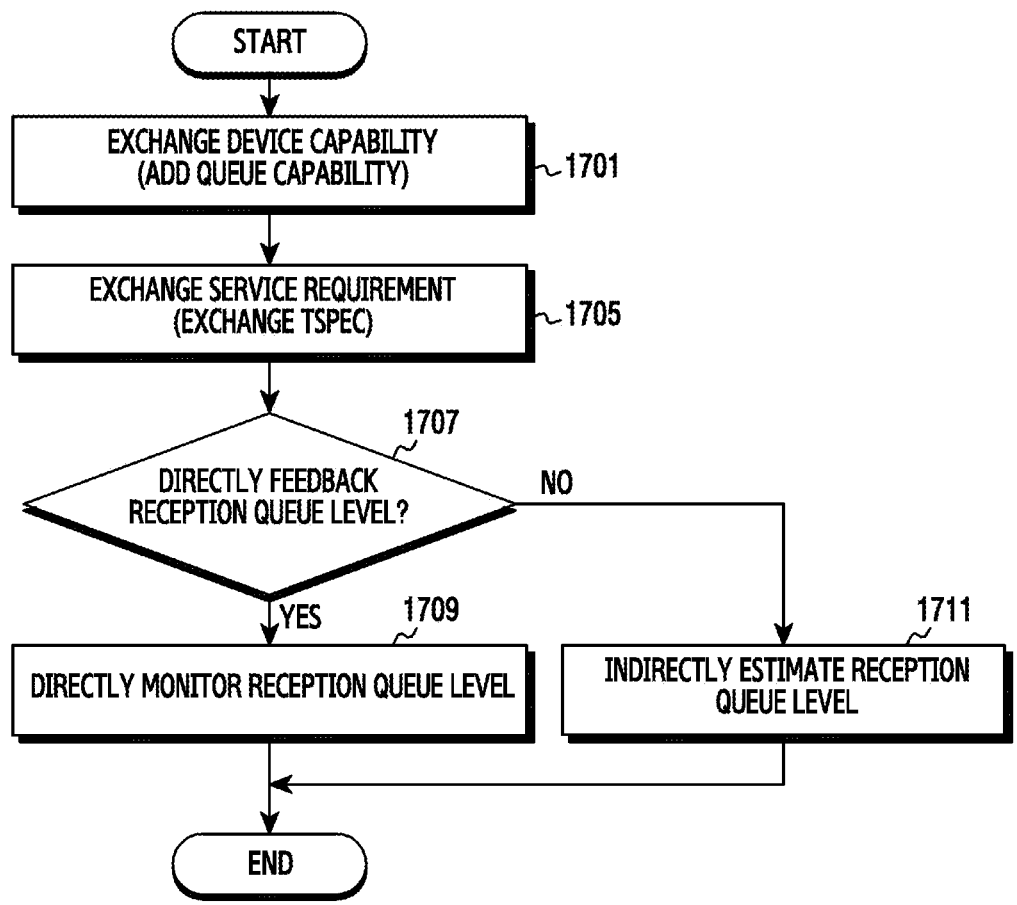
FIG. 17 illustrates an operation in which the transmission device monitors a reception state of the reception device according to an embodiment of the present disclosure.

FIG. 17 illustrates an operation in which the transmission device monitors a reception state of the reception device according to an embodiment of the present disclosure.

Referring to FIG. 17, the transmission device 100 exchanges a device capability with the reception device 200 in step 1701. For example, the device capability may include a maximum buffer capacity of each of the transmission device 100 and the reception device 200. For example, the transmission device 100 may transmit the maximum buffer capacity of the transmission device 100 to the reception device 200. Similarly, the reception device 200 may transmit the maximum buffer capacity of the reception device 200 to the transmission device 100. According to another embodiment of the present disclosure, the maximum buffer capacity may be referred to as a maximum queue value.

The transmission device 100 may exchange a service requirement in step 1705. For example, the transmission device 100 may exchange Traffic SPECification (TSPEC) with the reception device 200. The TSPEC may include at least one traffic characteristic among a minimum/maximum size of a frame used between the transmission device 100 and the reception device 200, a minimum/maximum time for which a channel is occupied, and a minimum/average/maximum data transmission rate, and an allowable delay time. At least one traffic characteristic may be used for controlling access to traffic between the transmission device 100 and the reception device 200.

The transmission device 100 may transmit the TSPEC including information about traffic generated in the transmission device 100 to the reception device 200. The reception device 200 may transmit information about a time for which the traffic can be transmitted to the transmission device 100 based on the TSPEC. The transmission device 100 may transmit the traffic to the reception device 200 based on the information about the time for which the traffic can be transmitted. For example, the TSPEC may include information indicating that conditions of a data transmission rate of 1 Gbps on average, a frame size of 1000 bytes to 2000 bytes, and a delay time shorter than 10 ms should be met to wirelessly provide a video streaming service.

According to an embodiment of the present disclosure, the TSPEC may include information about a data transmission rate of consumed data and a data transmission rate of required data.

The transmission device 100 determines whether the transmission device 100 can receive feedback of the reception queue level in step 1707. That is, the transmission device 100 may determine whether the transmission device 100 can receive information about the reception queue level from the reception device 200. For example, when receiving an extended block acknowledge frame from the reception device, the transmission device 100 may determine that the transmission device 100 can receive the information about the reception queue level.

When the transmission device 100 can receive the feedback of the reception queue level, the transmission device 100 directly monitors the reception queue level in step 1709. An example of a process in which the transmission device 100 directly monitors the reception queue level will be described in detail with reference to FIG. 19 below.

When the transmission device 100 cannot receive the feedback of the reception queue level, the transmission device 100 may indirectly estimate the reception queue level in step 1711. An example of a process in which the transmission device 100 indirectly estimates the reception queue level will be described in detail with reference to FIG. 20 below.

Figure 18:
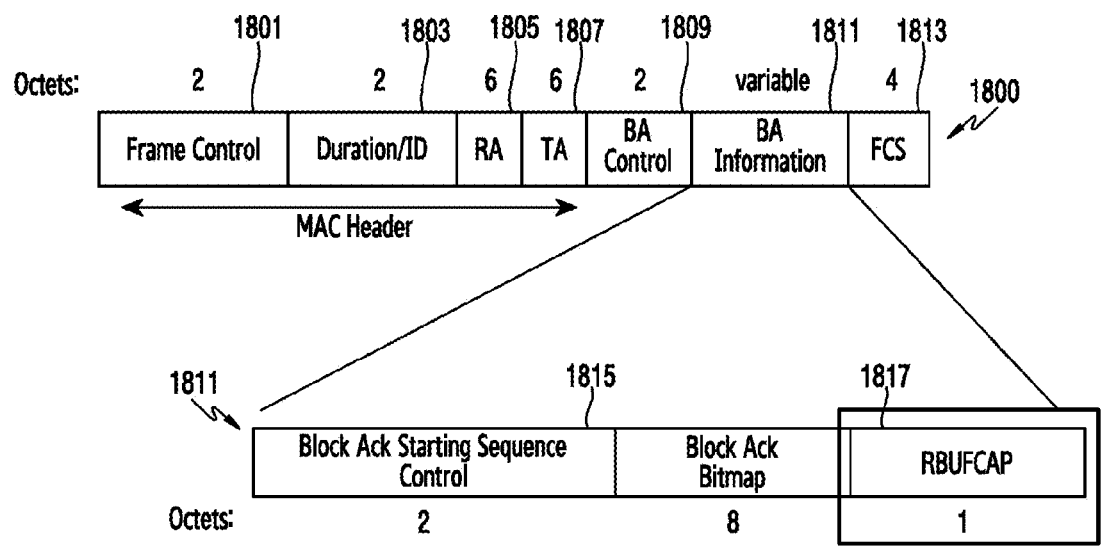
FIG. 18 illustrates an extended Block Acknowledge (BA) frame for estimating a queue level of the reception device by the transmission device according to an embodiment of the present disclosure.

FIG. 18 illustrates an extended Block Acknowledge (BA) frame 1800 for estimating the queue level of the reception device by the transmission device according to an embodiment of the present disclosure.

Referring to FIG. 18, the extended BA frame 1800 may include a frame control field 1801, a duration/IDentifier (ID) field 1803, a Receiver Address (RA) field 1805, a Transmitter Address (TA) field 1807, a Block Acknowledge (BA) control field 1809, a BA information field 1811, and a Frame Check Sequence (FCS) field 1813.

The frame control field may include control information of the extended BA frame. The duration/ID field may include information for identifying the extended BA frame.

The frame control field, the duration/ID field, the RA field, and the TA field may be referred to as a Media Access Control (MAC) header. The FCS frame may include information for identifying whether frames are integrated and whether frames are normally received.

The extended BA frame may include a BA starting sequence control field 1815 and a Receiver BUFfer CAPacity (RBUFCAP) field 1817. The RBUFCAP field may include information about an available buffer capacity in a current reception state of the reception device 200. The RBUFCAP field may be used for determining a capacity of a buffer which the transmission device 100 having received the extended BA frame from the reception device 200 will transmit to the reception device 200 in a next frame. That is, the RBUFCAP field may be used for determining a maximum capacity of data which the transmission device 100 transmits to the reception device 200.

According to another embodiment of the present disclosure, the BA frame may include information about a channel between the transmission device 100 and the reception device 200. The information about the channel may include at least one of an RSSI, SNR, Error Vector Magnitude (EVM), and CQI, measured by the reception device 200.

According to another embodiment of the present disclosure, the reception device 200 may not transmit the information about the channel through the BA frame. For example, the reception device 200 may insert the information about the channel into data to be transmitted to the transmission device 100 and transmit the data to the transmission device 100.

Figure 19:
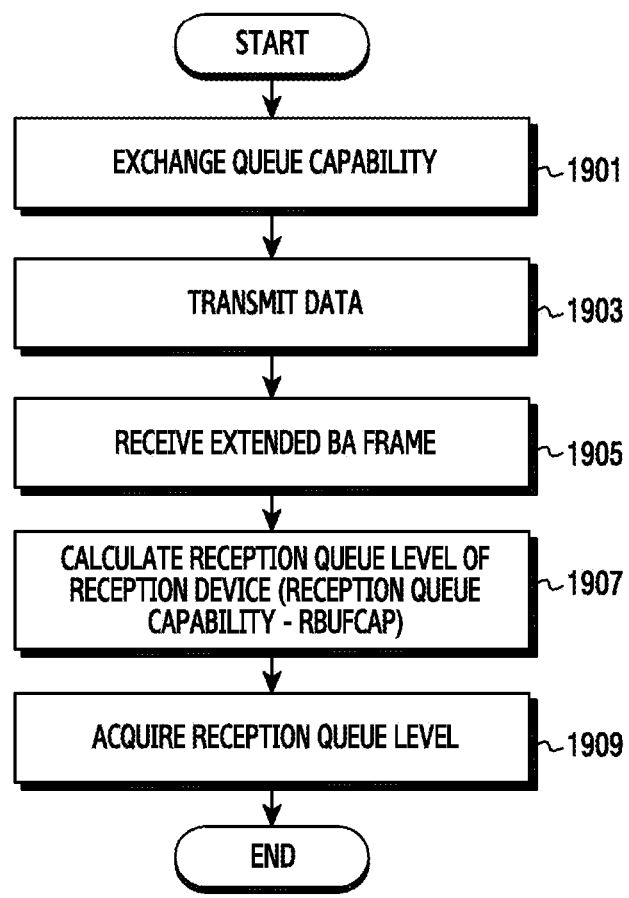
FIG. 19 illustrates an operation in which the transmission device directly monitors the queue level of the reception device according to an embodiment of the present disclosure.

FIG. 19 illustrates an operation in which the transmission device directly monitors the queue level of the reception device according to an embodiment of the present disclosure.

Referring to FIG. 19, the transmission device 100 exchanges a queue capability in step 1901. The transmission device 100 may transmit information about a maximum queue capacity, that is, a maximum buffer capacity of the transmission device 100 to the reception device 200. Similarly, the reception device 200 may transmit information about a maximum buffer capacity of the reception device 200 to the transmission device 100.

The transmission device 100 transmits data in step 1903. The transmission device 100 may transmit the data to the reception device 200. For example, the transmission device 100 may transmit image data or voice data to the reception device 200.

The transmission device 100 receives an extended BA frame in step 1905. The transmission device 100 may receive an acknowledge(ACK) frame from the reception device 200. For example, the transmission device 100 may identify information about the available buffer capacity in the current reception state of the reception device 200 through the RBUFCAP field of the extended BA frame as illustrated in FIG. 18.

The transmission device 100 calculates a queue level of the reception device 200 in step 1907. According to an embodiment of the present disclosure, the transmission device 100 may calculate a buffer level, that is, the queue level of the reception device 200 by calculating a difference between the maximum buffer capacity of the reception device 200 received in step 1901 and the currently available buffer capacity of the reception device 200 included in the RBUFCAP field. The transmission device 100 may prevent the generation of capability deterioration due to overhead by using only the RBUFCAP field of the acknowledge (ACK) frame of the existing data transmission sequence without using an additional control packet or field to receive the queue level of the reception device 200 from the reception device 200.

The transmission device 100 acquires the reception queue level in step 1909. The transmission device 100 may acquire the queue level of the reception device 200 through the difference between the received maximum buffer capacity of the reception device 200 and the currently available buffer capacity of the reception device 200 included in the RBUFCAP field.

Figure 20:
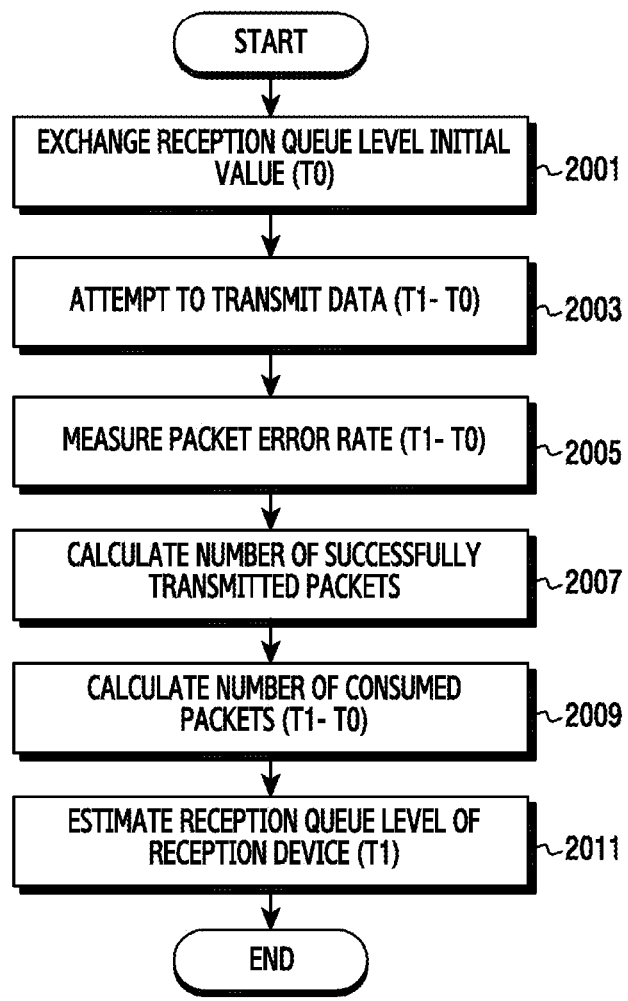
FIG. 20 illustrates an operation in which the transmission device indirectly estimates the queue level of the reception device according to an embodiment of the present disclosure.

FIG. 20 illustrates an operation in which the transmission device indirectly estimates the queue level of the reception device according to an embodiment of the present disclosure.

Referring to FIG. 20, the transmission device 100 identifies an initial reception queue level of the reception device 200 from the reception device 200 in step 2001. According to an embodiment of the present disclosure, the transmission device 100 may identify the initial reception queue level through a number of packets in all frames which are initially transmitted to the reception device 200. According to another embodiment of the present disclosure, the transmission device 100 may receive information about an average reception queue level of the reception device 200 from the reception device 200 and identify the initial reception queue level based on the average reception queue level. According to another embodiment of the present disclosure, the initial queue level of the reception device 200 may be pre-appointed. The transmission device 100 may identify the initial reception queue level through the pre-appointed initial queue level of the reception device 200.

The transmission device 100 attempts to transmit data to the reception device 200 in step 2003. The transmission device 100 may transmit the data to the reception device 200 for a time from t0 to t1.

The transmission device 100 measures a packet error rate in step 2005. The transmission device 100 may measure an error rate of a packet transmitted to the reception device 200 for the time from t0 to t1.

The transmission device 200 calculates a number of packets that have been successfully transmitted in step 2007. The transmission device 100 may calculate the number of packets, which have been successfully transmitted, by multiplying a packet delivery rate and a total number of packets that the transmission device 100 has attempted to transmit to the reception device 200 for the time from t0 to t1. The transmission device 100 may calculate the packet delivery rate based on the packet error rate measured in step 2005.

The transmission device 100 calculates a number of consumed packets in step 2009. The transmission device 100 may acquire a consuming rate of a service based on the type of real time streaming service provided to the reception device 200. For example, when the real time streaming service is a real time video streaming service, a used main video resolution-specific packet consuming rate may be show in Table 1 below.

TABLE 1

| Video resolution | Consuming rate |
| --- | --- |
| 480P60 | 28800 frames/second |
| 720P60 | 43200 frames/second |
| 1080P60(full HD(High Definition) | 64800 frames/second |
| 4K UHD(Ultra High Definition) | 129600 frames/second |

The transmission device 100 may calculate the number of packets consumed by the reception device 200 for the time from t0 to t1 based on the consuming rate.

The transmission device 100 estimates the reception queue level of the reception device 200 in step 2011. The transmission device 100 may calculate the reception queue level of the reception device 200 through equation (6) below.

$$QL(t_1) = IV_{r0} + P_{Trial}(t_1-t_0)*(1-PER(t_1-t_0)) + P_{consumed}(t_1-t_0) \quad (6)$$

In equation (6) above, QL(t1) denotes a queue level of the reception device 200 at t1. $IV_{r0}$ denotes an initial queue level of the reception device 200 at t0. $P_{trial}$ (t1-t0) denotes a number of packets that the transmission device 100 has attempted to the reception device 200 for the time from t0 to t1. PER(t140) denotes a transmission rate of packets that the transmission device 100 has attempted to transmit to the reception device 200 for the time from t0 to t1. $P_{consumed}$ (t1-t0) denotes a consuming rate of packets consumed by the reception device 200 for the time from t0 to t1.

Figure 21:
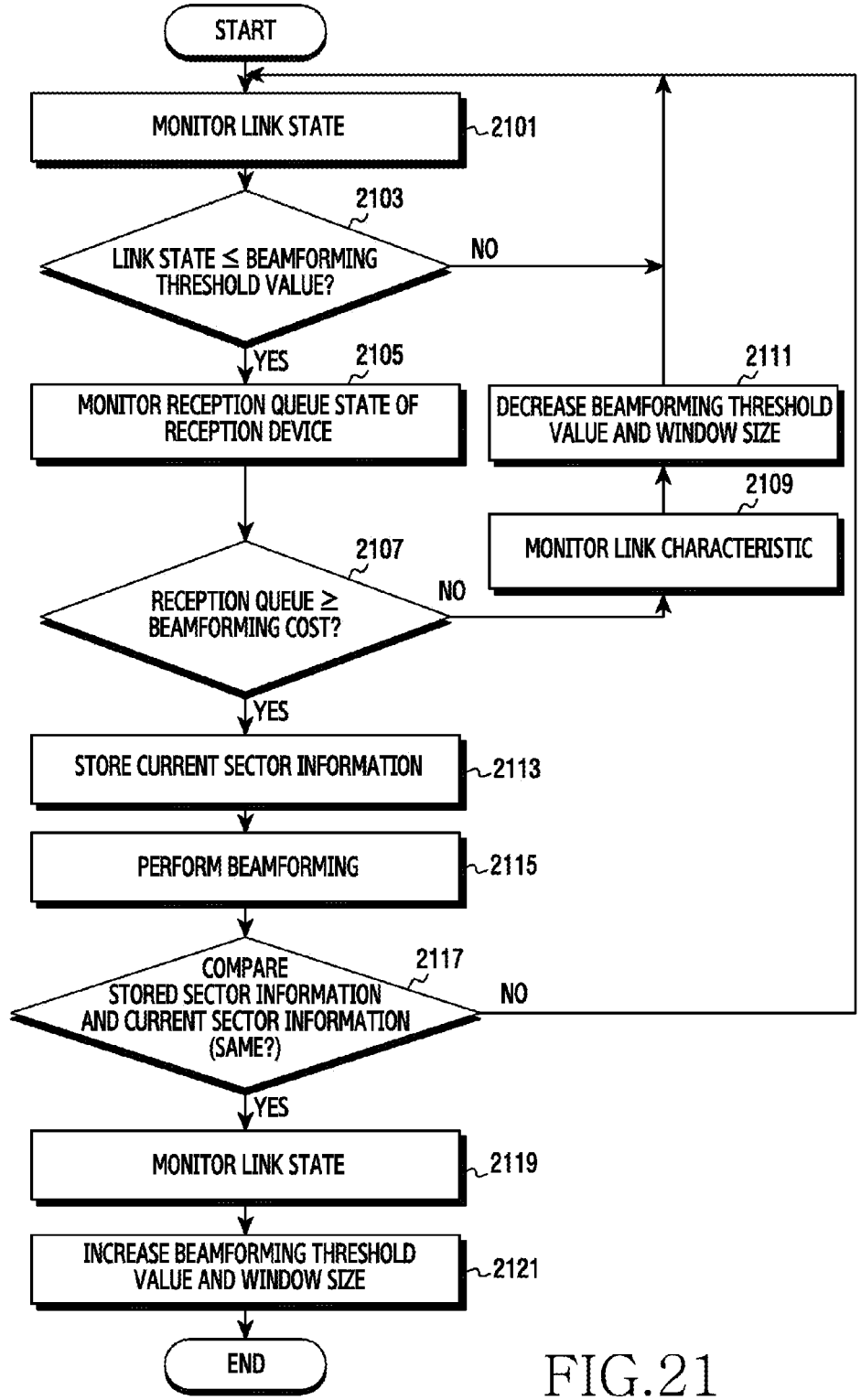
FIG. 21 illustrates an operation in which the transmission device prevents performance of unnecessary beamforming according to an embodiment of the present disclosure.
Figure 22:
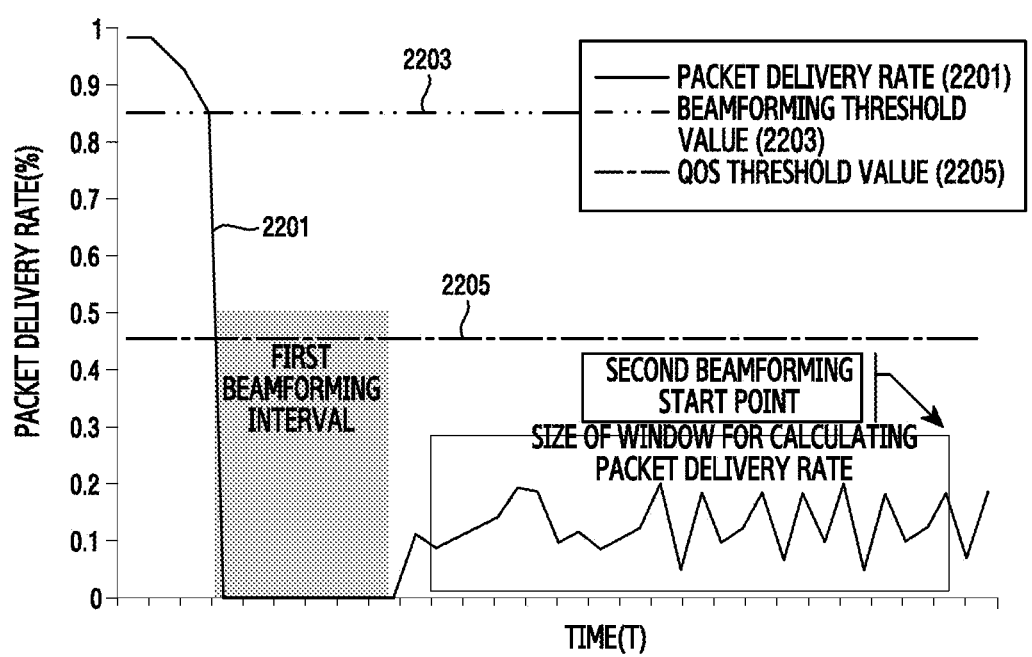
FIG. 22 illustrates a window for calculating a packet delivery rate by the transmission device according to an embodiment of the present disclosure.

FIG. 21 illustrates an operation in which the transmission device prevents performance of unnecessary beamforming according to an embodiment of the present disclosure.

Referring to FIG. 21, the transmission device 100 monitors a state of a link connected to the reception device 200 in step 2101. The link state may refer to a state of a link which can be measured for a long time on average. For example, the transmission device 100 may calculate a packet delivery rate of packets transmitted to the reception device 200. The transmission device 100 may monitor a change in the packet delivery rate.

The transmission device 100 determines whether the determination of the link state is detected in step 2103. For example, when the packet delivery rate is equal to or smaller than a beamforming threshold value, the transmission device 100 may determine that the link state deteriorates. When the packet delivery rate is larger than the beamforming threshold value, the transmission device 100 may return to step 2101 and monitor the link state.

When a packet delivery rate is equal to or smaller than the beamforming threshold value, the transmission device 100 monitors a reception queue state of the reception device 200 in step 2105. For example, the transmission device 100 may identify the reception queue level of the reception device 200 as illustrated in FIGS. 17 to 20.

The transmission device 100 identifies whether the reception queue level is a level at which beamforming can be performed in step 2107. When reception queue level is higher than or equal to a beamforming cost, the transmission device 100 may determine that the beamforming can be performed.

When the reception queue level is lower than the beamforming cost, the transmission device 100 monitors a characteristic of the link in step 2109. The characteristic of the link refers to a state of the link for a short time. For example, monitoring the link characteristic refers to monitoring whether the packet delivery rate has fluctuation since the average of the packet delivery rates for a long time exceeds the beamforming threshold value but burst errors occur for a short time. The transmission device 100 may monitor the characteristic of the link during a predetermined link characteristic monitoring interval.

The transmission device 100 decreases the beamforming threshold value and the size of the interval in which the link characteristic is monitored in step 2111. For example, when the reception queue level is lower than the beamforming cost, the transmission device 100 may determine that the beamforming is performed late in step 2107. For example, referring to FIG. 22, when a packet delivery rate 2201 is equal to or smaller than a beamforming threshold value 2203, the transmission device 100 may perform first beamforming. After the performance of the first beamforming, when the packet delivery rate 2201 is not larger than a Quality of Service (QoS) threshold value 2205, the transmission device 100 may monitor the link characteristic during a predetermined interval for monitoring the link characteristic to perform second beamforming. However, when the predetermined interval for monitoring the link characteristic is larger than a predetermined reference value, timing at which second beamforming is performed may be delayed. Further, when the beamforming threshold value 2203 is larger than a predetermined reference value, a timing at which the second beamforming is performed may be delayed. Accordingly, the transmission device 100 may decrease the beamforming threshold value to perform the beamforming more rapidly and decrease the interval in which the link characteristic is monitored.

When the reception queue level is higher than or equal to the beamforming cost, the transmission device 100 stores current sector information in step 2113. The transmission device 100 may store the current sector information to compare sector information after the performance of the beamforming and the current sector information.

The transmission device 100 performs the beamforming in step 2115. When the reception queue level is higher than or equal to the beamforming cost, the transmission device 100 may determine that the reception queue level does not become zero while the beamforming is performed, and perform the beamforming.

The transmission device 100 may compare the sector information stored in step 2113 and a sector according to a result of the performance of the beamforming in step 2117. When the stored sector information is not the same as the sector according to the result of the performance of the beamforming, the transmission device 100 may return to step 2101 and monitor the link state.

When the stored sector information is the same as the sector according to the result of the performance of the beamforming, the transmission device 100 monitors the link characteristic in step 2119. The transmission device 100 may monitor the link characteristic during the predetermined link characteristic monitoring interval.

The transmission device 100 increases the beamforming threshold value and the interval in which the link characteristic is monitored in step 2121. When the sector selected according to the result of the beamforming is the same as the existing stored sector in step 2117, the transmission device 100 may determine that unnecessary beamforming has been performed. That is, the transmission device 100 may determine that the beamforming is performed more rapidly than necessary. Accordingly, the transmission device 100 may increase the beamforming threshold value and the size of the link characteristic monitoring interval to delay the timing at which the beamforming is performed.

Figure 23:
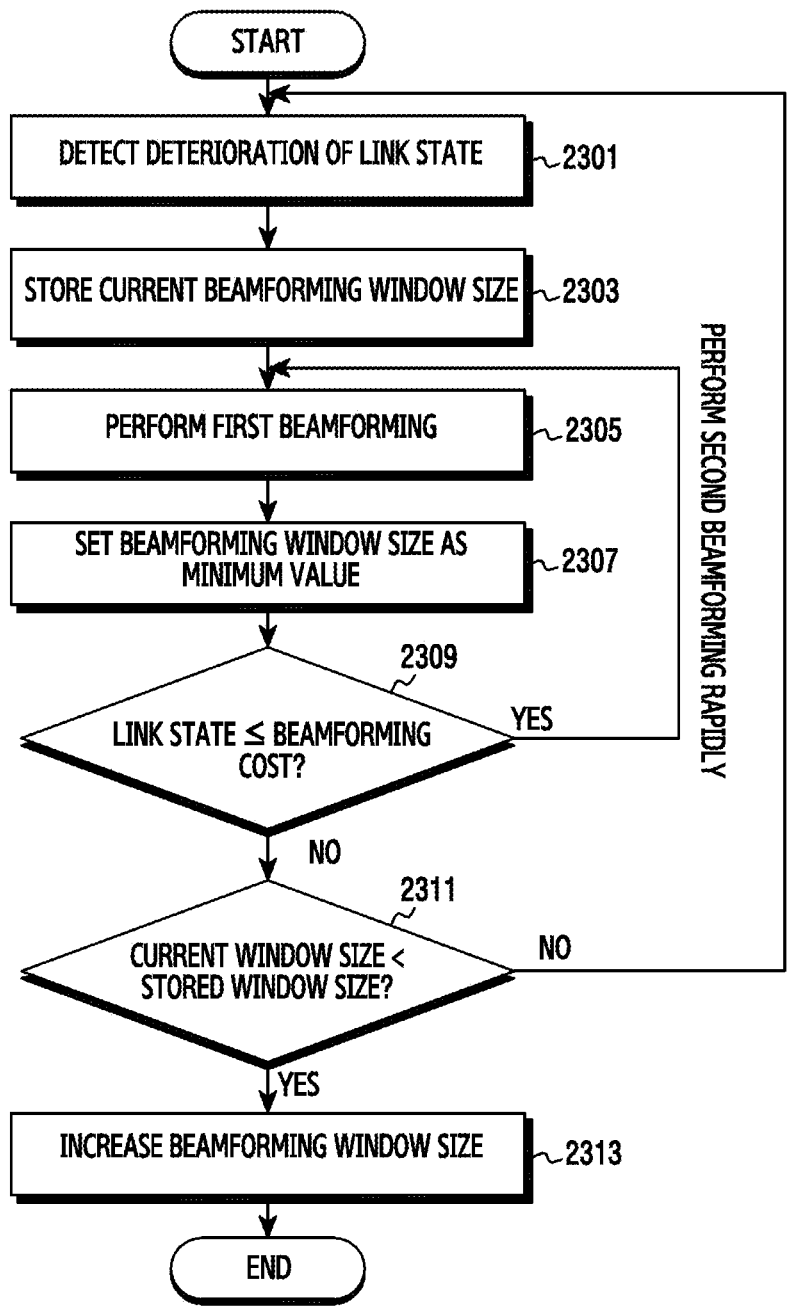
FIG. 23 illustrates an operation in which the transmission device performs second beamforming rapidly after performing first beamforming according to an embodiment of the present disclosure.

FIG. 23 illustrates an operation in which the transmission device performs second beamforming quickly after performing the first beamforming according to an embodiment of the present disclosure.

Referring to FIG. 23, the transmission device 100 monitors deterioration of a state of a link connected to the reception device 200 in step 2301. For example, when a delivery rate of a packet transmitted to the reception device 200 is smaller than a beamforming threshold value, the transmission device 100 may determine that the link state has deteriorated.

The transmission device 100 stores the size of a current beamforming window in step 2303. The transmission device 100 may determine the size of the beamforming window for determining whether the packet delivery rate is larger than or equal to a service threshold value before performing the beamforming.

The transmission device 100 performs first beamforming in step 2305. When the packet delivery rate is smaller than the service threshold value, the transmission device 100 may perform the first beamforming.

The transmission device 100 sets the size of the beamforming window as a minimum value in step 2307. The transmission device 100 may set the size of the beamforming window as the minimum value in order to perform the second beamforming rapidly after the first beamforming.

The transmission device 100 identifies whether the deteriorate of the link state is detected in step 2309. When the packet delivery rate is smaller than the beamforming threshold value, the transmission device 100 may determine whether a reception queue level of the reception device 200 is lower than a beamforming cost. When the reception queue level is lower than the beamforming cost, the reception device 100 may return to step 2305 and perform the second beamforming. The transmission device 100 may perform the second beamforming rapidly according to the size of the beamforming window set as the minimum value. As the transmission device 100 sets the size of the beamforming window set as the minimum value, it is possible to prevent the reception queue level from being zero due to the late beamforming when the size of the beamforming window is set as a large value.

When the reception queue level is larger than or equal to the beamforming cost, the transmission device 100 compares the existing stored beamforming window size and the beamforming window size set as the minimum value in step 2311. When the existing stored beamforming window size is larger than the beamforming window size set as the minimum value, the transmission device 100 may return to step 2301.

When the existing stored beamforming window size is smaller than the beamforming window size set as the minimum value, the transmission device 100 increases the beamforming window size set as the minimum value in step 2313. The transmission device 100 may increase the beamforming window size set as the minimum value after performing the second beamforming quickly.

Through the present disclosure, it is possible to prevent a disconnection or delay of a screen in a device that provides, through a radio link, a service to control a real time QoS, that is, a service having a high user requirement such as high definition video streaming and a real time game.

Methods stated in claims and/or specifications according to various embodiments may be implemented by hardware, software, or a combination of hardware and software.

In the implementation of software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular or plural expressions are selected to be suitable for proposed situations for convenience of description, and the present disclosure is not limited to the singular or plural elements. An element expressed in a plural form may be configured in singular, or an element expressed in a singular form may be configured in plural.

Although the present disclosure has been described with embodiments, various changes and modifications may be suggested to one skilled in the art. It is intended that the present disclosure encompass such changes and modifications as fall within the scope of the appended claims.

What is claimed is:

1. A method for operating a transmission device in a wireless communication system, the method comprising:
   determining a size of data in a buffer of a reception device;
   determining a time interval corresponding to the size of the data in the buffer;
   when a beam training interval predetermined for performing a beam training is within the time interval corresponding to the size of the data in the buffer, performing the beam training; and
   when the beam training interval is not within the time interval corresponding to the size of the data in the buffer, determining whether to perform the beam training, based on a link quality between the transmission device and the reception device.

2. The method of claim 1, further comprising:
   receiving, from the reception device, information for a total available capacity of the buffer and a current available capacity of the buffer,
   wherein the size of the data in the buffer is determined based on the total available capacity and the current available capacity.

3. The method of claim 1, wherein determining whether to perform the beam training comprises:
   determining whether to perform both a first beam training for identifying a sector and a second beam training for a beam refinement in the sector or perform only the second beam training with a sector determined through a previous beam training, and
   wherein the beam training comprises the first beam training and the second beam training.

4. The method of claim 1, further comprising:
storing information for a current sector detected by performing the beam training.

5. The method of claim 1, wherein determining whether to perform the beam training comprises:
determining whether a packet delivery rate between the transmission device and the reception device is higher than or equal to a service quality threshold, wherein a link quality comprises the packet delivery rate, and
wherein the service quality threshold is determined a based on a type of a service provided from the transmission device to the reception device.

6. The method of claim 1, wherein the time interval is a time interval until there is no data pending in the buffer by processing the data in the buffer.

7. The method of claim 1, wherein determining the size of the data in the buffer comprises:
when a link quality is lower than or equal to a predetermined threshold, determining the size of the data in the buffer.

8. The method of claim 4, further comprising:
when a sector detected according to a result of a next beam training is identical to the current sector information is stored, increasing a size of an interval in which a link quality is calculated.

9. The method of claim 5, further comprising:
when the packet delivery rate is lower than the service quality threshold, performing the beam training; and
when the packet delivery rate is higher than or equal to the service quality threshold, monitoring a change of the size of the data in the buffer without performing the beam training.

10. A method of operating a reception device in a wireless communication system, the method comprising:
transmitting, to a transmission device, information for indicating a size of data in a buffer of the reception device; and
receiving, from the transmission device, data, through at least one beam determined based on a beam training,
wherein the beam training is performed when a beam training interval predetermined for performing the beam training is within a time interval corresponding to the size of the data in the buffer or is performed based on a link quality between the transmission device and the reception device when the beam training interval is not within the time interval, and
wherein the time interval corresponding to the size of the data in the buffer is determined by the transmission device.

11. A transmission device in a wireless communication system, the transmission device comprising:
at least one transceiver; and
at least one processor operatively coupled to the at least one transceiver,
wherein the at least one processor is configured to:
determine a size of data in a buffer of a reception device;
determine a time interval corresponding to the size of the data in the buffer;
when a beam training interval predetermined for performing a beam training is within the time interval corresponding to the size of the data in the buffer, perform the beam training; and
when the beam training interval is not within the time interval corresponding to the size of the data in the buffer, determine whether to perform the beam training, based on a link quality between the transmission device and the reception device.

12. The transmission device of claim 11, wherein the at least one transceiver is further configured to:
receive, from the reception device, information for a total available capacity of the buffer and a current available capacity of the buffer, and
wherein the size of the data in the buffer is determined based on the total available capacity and the current available capacity.

13. The transmission device of claim 11, wherein the at least one processor, in order to determine whether to perform the beam training, is configured to:
determine whether to perform both a first beam training for identifying a sector and a second beam training for a beam refinement in the sector or perform only the second beam training with a sector determined through a previous beam training, and
wherein the beam training comprises the first beam training and the second beam training.

14. The transmission device of claim 11, wherein the at least one processor is further configured to:
store information for a current sector detected by performing the beam training.

15. The transmission device of claim 11, wherein the at least one processor, in order to determine whether to perform the beam training, is configured to:
determine whether a packet delivery rate between the transmission device and the reception device is higher than or equal to a service quality threshold, wherein the link quality comprises the packet delivery rate, and
wherein the service quality threshold is determined based on a type of a service provided from the transmission device to the reception device.

16. The transmission device of claim 11, wherein the time interval is a time interval until there is no data pending in the buffer by processing the data in the buffer.

17. The transmission device of claim 11, wherein the at least one processor is, in order to determine the size of the data in the buffer, configured to:
when the link quality is lower than or equal to a predetermined threshold, determine the size of the data in the buffer.

18. The transmission device of claim 14, wherein the at least one processor is further configured to:
when a sector detected according to a result of a next beam training is identical to the current sector for which information is stored, increase a size of an interval in which the link quality is calculated.

19. The transmission device of claim 15, wherein the at least one processor is further configured to
perform, when the packet delivery rate is lower than the service quality threshold, the beam training; and
monitor, when the packet delivery rate is higher than or equal to the service quality threshold, a change of the size of the data in the buffer without performing the beam training.

* * * * *